United States Patent
Shindo et al.

(10) Patent No.: US 9,135,718 B2
(45) Date of Patent: Sep. 15, 2015

(54) IMAGE PROCESSING APPARATUS AND CONTROL METHOD THEREFOR

(71) Applicant: CANON KABUSHIKI KAISHA, Tokyo (JP)

(72) Inventors: Yuki Shindo, Hadano (JP); Izumi Kanai, Machida (JP); Yasuo Suzuki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 113 days.

(21) Appl. No.: 13/797,080

(22) Filed: Mar. 12, 2013

(65) Prior Publication Data

US 2013/0259364 A1    Oct. 3, 2013

(30) Foreign Application Priority Data

Mar. 30, 2012 (JP) ................................. 2012-081334
Mar. 30, 2012 (JP) ................................. 2012-081336

(51) Int. Cl.
| | |
|---|---|
| *G06K 9/46* | (2006.01) |
| *G06T 7/40* | (2006.01) |
| *G06K 9/00* | (2006.01) |
| *G06T 7/00* | (2006.01) |

(52) U.S. Cl.
CPC ............ *G06T 7/408* (2013.01); *G06K 9/00456* (2013.01); *G06K 9/4652* (2013.01); *G06T 7/0081* (2013.01); *G06T 7/0087* (2013.01); *G06T 2207/10024* (2013.01); *G06T 2207/10068* (2013.01); *G06T 2207/10116* (2013.01); *G06T 2207/20021* (2013.01); *G06T 2207/20076* (2013.01); *G06T 2207/20148* (2013.01); *G06T 2207/30004* (2013.01)

(58) Field of Classification Search
CPC ............ G06K 9/00456; G06K 9/4652; G06T 7/0081; G06T 7/0087; G06T 7/408
USPC ......... 382/164, 239, 232, 162, 274, 171, 166, 382/100; 358/520, 461
See application file for complete search history.

(56) References Cited

U.S. PATENT DOCUMENTS

| | | | | |
|---|---|---|---|---|
| 5,875,035 | A | * | 2/1999 | Motosugi et al. ............. 358/296 |
| 5,937,233 | A | * | 8/1999 | Nakata et al. .................... 399/85 |
| 6,735,341 | B1 | * | 5/2004 | Horie et al. .................... 382/239 |
| 6,873,731 | B2 | * | 3/2005 | Takakura et al. .............. 382/172 |
| 8,170,364 | B2 | * | 5/2012 | Nakajima et al. ............. 382/274 |
| 2003/0072044 | A1 | * | 4/2003 | Hashiguchi et al. .......... 358/520 |

(Continued)

FOREIGN PATENT DOCUMENTS

| | | | |
|---|---|---|---|
| JP | 2003-244469 | 8/2003 | |
| JP | 2013219618 A | * 10/2013 | ............... H04N 1/46 |

*Primary Examiner* — Mekonen Bekele
(74) *Attorney, Agent, or Firm* — Cowan, Liebowitz & Latman, P.C.

(57) ABSTRACT

An image processing apparatus according to the present invention comprises: an acquisition unit that acquires a statistical value of pixel values for each divided region; a determination unit that compares for each divided region the statistical value of the divided region acquired by the acquisition unit with a first threshold and determines whether the divided region is as color region or a monochrome region; and a re-determination unit that compares a statistical value of an adjacent divided region with a second threshold, by which a divided region is more likely determined as a color region than by the first threshold, for each adjacent divided region, and re-determines whether the adjacent divided region is a color region or a monochrome region.

7 Claims, 26 Drawing Sheets

(56) References Cited

U.S. PATENT DOCUMENTS

2004/0105582 A1* 6/2004 Boesten et al. ............... 382/170
2004/0218837 A1* 11/2004 Shiyama ....................... 382/305
2005/0100212 A1* 5/2005 Eguchi et al. ................. 382/164
2006/0008139 A1* 1/2006 Hirota et al. .................. 382/162
2014/0064605 A1* 3/2014 Komoriya et al. ............ 382/154
2015/0043813 A1* 2/2015 Shindo et al. ................. 382/164

* cited by examiner

FIG. 4

| d[0][2]<br>mc[0][2]=1<br>j_b[0][2]=2 | d[0][3]<br>mc[0][3]=1<br>j_b[0][3]=2 | d[0][4]<br>mc[0][4]=1<br>j_b[0][4]=0 | d[0][5]<br>mc[0][5]=1<br>j_b[0][5]=0 | d[0][6]<br>mc[0][6]=1<br>j_b[0][6]=0 | d[0][7]<br>mc[0][7]=1<br>j_b[0][7]=0 | d[0][8]<br>mc[0][8]=1<br>j_b[0][8]=0 | d[0][9]<br>mc[0][9]=1<br>j_b[0][9]=0 |
|---|---|---|---|---|---|---|---|
| d[1][2]<br>mc[1][2]=0<br>j_b[1][2]=0 | d[1][3]<br>mc[1][3]=0<br>j_b[1][3]=0 | d[1][4]<br>mc[1][4]=1<br>j_b[1][4]=1 | d[1][5]<br>mc[1][5]=1<br>j_b[1][5]=0 | d[1][6]<br>mc[1][6]=1<br>j_b[1][6]=0 | d[1][7]<br>mc[1][7]=1<br>j_b[1][7]=0 | d[1][8]<br>mc[1][8]=1<br>j_b[1][8]=0 | d[1][9]<br>mc[1][9]=1<br>j_b[1][9]=0 |
| d[2][2]<br>mc[2][2]=0<br>j_b[2][2]=0 | d[2][3]<br>mc[2][3]=0<br>j_b[2][3]=0 | d[2][4]<br>mc[2][4]=1<br>j_b[2][4]=1 | d[2][5]<br>mc[2][5]=1<br>j_b[2][5]=0 | d[2][6]<br>mc[2][6]=1<br>j_b[2][6]=0 | d[2][7]<br>mc[2][7]=1<br>j_b[2][7]=0 | d[2][8]<br>mc[2][8]=1<br>j_b[2][8]=0 | d[2][9]<br>mc[2][9]=1<br>j_b[2][9]=0 |
| d[3][2]<br>mc[3][2]=0<br>j_b[3][2]=0 | d[3][3]<br>mc[3][3]=0<br>j_b[3][3]=0 | d[3][4]<br>mc[3][4]=1<br>j_b[3][4]=1 | d[3][5]<br>mc[3][5]=1<br>j_b[3][5]=0 | d[3][6]<br>mc[3][6]=1<br>j_b[3][6]=0 | d[3][7]<br>mc[3][7]=1<br>j_b[3][7]=0 | d[3][8]<br>mc[3][8]=1<br>j_b[3][8]=0 | d[3][9]<br>mc[3][9]=1<br>j_b[3][9]=0 |

323

IMAGE PROCESSING APPARATUS AND CONTROL METHOD THEREFOR

BACKGROUND OF THE INVENTION

1. Field of the Invention

The present invention relates to an image processing apparatus and a control method therefor.

2. Description of the Related Art

An image processing apparatus in which an input image is divided into a monochrome region (region of a monochrome image) and a color region (region of a color image) and γ correction is performed separately for the monochrome region and color region has been suggested. For example, an image processing apparatus has been suggested in which γ correction stipulated in digital imaging and communication in medicine (DICOM), Part 14 (referred to hereinbelow as "DICOM γ correction") is implemented with respect to a monochrome region and γ correction with γ=2.2 (referred to hereinbelow as "2.2γ correction") is implemented with respect to the color region has been suggested. Where such an image processing apparatus is used, when a monochrome image such as a Roentgen image and a color image such as an endoscope image are displayed, the DICOM γ correction is performed with respect to the monochrome image, the 2.2γ correction is performed with respect to the color image, and each image is displayed with adequate gradation.

A method for dividing an input image into a monochrome region and a color region is disclosed, for example, in Japanese Patent Application Publication No. 2003-244469. More specifically, Japanese Patent Application Publication No. 2003-244469 discloses a method by which an input image is divided into a plurality of rectangular blocks and it is determined whether a monochrome region or a color region is present in each rectangular block.

The following issues should be taken into account when determining the presence of monochrome regions and color regions.

A certain number of color pixels, such as color annotation, can be present in a monochrome image (for example, a Roentgen image. However, even though the color pixels are included, the monochrome image should be displayed by implementing the DICOM γ correction. Therefore, when the monochrome region is determined, such a region should be determined as a monochrome region even when a certain number of color pixels are present therein.

However, when the technique disclosed in Japanese Patent Application Publication No. 2003-244469 is used by taking the aforementioned issue into account, the following tradeoff situation sometimes occurs. Thus, where either of the monochrome region and color region is determined correctly, the other one is determined erroneously.

This tradeoff will be explained below with reference to FIGS. 12A to 12D. FIG. 12A shows an example of an input image. A "color region A" is a rectangular block of a color image (endoscope image) and should be determined as a color region. A "monochrome region B" is a rectangular block of a monochrome image (Roentgen image) and should be determined as a monochrome image. FIG. 12B is an enlarged view of the color region A shown in FIG. 12A. FIG. 12C is an enlarged view of the monochrome region B shown in FIG. 12A.

In the color region A and the monochrome region B, the ratio of the number of color pixels to the total number of pixels in a rectangular block is substantially the same. Therefore, when the presence of the monochrome region or color region is determined for each rectangular block with respect to the image shown in FIG. 12A, the same determination result is obtained from the color region A and the monochrome region B. Thus, where the color region A is correctly determined as a color region, the monochrome region B is erroneously determined as a color region, and where the monochrome region B is correctly determined as a monochrome region, the color region A is erroneously determined as a monochrome region. In FIG. 12D, a zone that is determined as a color region when the monochrome region B is correctly determined as a monochrome region is shown by oblique hatching.

SUMMARY OF THE INVENTION

The present invention provides a technique that inhibits the occurrence of a tradeoff such that where either of a monochrome region and a color region is determined correctly, the other one is determined erroneously.

The present invention in its first aspect provides an image processing apparatus comprising:

an acquisition unit that acquires a statistical value of pixel values for each divided region obtained by dividing an input image;

a determination unit that compares for each divided region the statistical value of the divided region acquired by the acquisition unit with a first threshold and determines whether the divided region is as color region or a monochrome region; and a re-determination unit that compares a statistical value of an adjacent divided region, which is a divided region, from among divided regions determined by the determination unit as monochrome regions, that is adjacent to the divided region determined by the determination unit as a color region, with a second threshold, by which a divided region is more likely determined as a color region than by the first threshold, for each adjacent divided region, and re-determines whether the adjacent divided region is a color region or a monochrome region.

The present invention in its second aspect provides a control method for an image processing apparatus, the method comprising:

an acquisition step of acquiring a statistical value of pixel values for each divided region obtained by dividing an input image;

a determination step of comparing for each divided region the statistical value of the divided region acquired in the acquisition step with a first threshold and determining whether the divided region is a color region or a monochrome region; and a re-determination step of comparing a statistical value of an adjacent divided region, which is a divided region, from among divided regions determined in the determination step as monochrome regions, that is adjacent to the divided region determined in the determination step as a color region, with a second threshold, by which a divided region is more likely determined as a color region than by the first threshold, for each adjacent divided region, and re-determining whether the adjacent divided region is a color region or a monochrome region.

The present invention in its third aspect provides an image processing apparatus that divides an input image into a color region and a monochrome region, the apparatus comprising:

an acquisition unit that acquires a statistical value of pixel values for each divided region obtained by dividing the input image;

a division unit that divides the input image into a color region and a monochrome region on the basis of the statistical value for each divided region acquired by the acquisition unit; and a movement unit that moves a boundary between the color region and the monochrome region, which are divided by the division unit, so that the boundary passes inside a boundary proximity region, which is a region separated from the boundary by a predetermined distance toward a monochrome region, when a brightness value of the boundary proximity region is lower than a predetermined value.

The present invention in its fourth aspect provides a control method for an image processing apparatus that divides an input image into a color region and a monochrome region, the control method comprising:

an acquisition step of acquiring a statistical value of pixel values for each divided region obtained by dividing the input image;

a division step of dividing the input image into a color region and a monochrome region on the basis of the statistical value for each divided region acquired in the acquisition step; and a movement step of moving a boundary between the color region and the monochrome region, which are divided in the division step, so that the boundary passes inside a boundary proximity region, which is a region separated from the boundary by a predetermined distance toward a monochrome region, when a brightness value of the boundary proximity region is lower than a predetermined value.

In accordance with the present invention, the occurrence of a tradeoff, such that where either of a monochrome region and a color region is determined correctly, the other one is determined erroneously, can be inhibited.

Further features of the present invention will become apparent from the following description of exemplary embodiments with reference to the attached drawings.

BRIEF DESCRIPTION OF THE DRAWINGS

FIG. 4 illustrates a specific example of a method for calculating the boundary peripheral region monochrome frequency;

DESCRIPTION OF THE EMBODIMENTS

Embodiment 1

An image processing apparatus and a control method therefor according to Embodiment 1 of the present invention will be described below.

Figure 1:
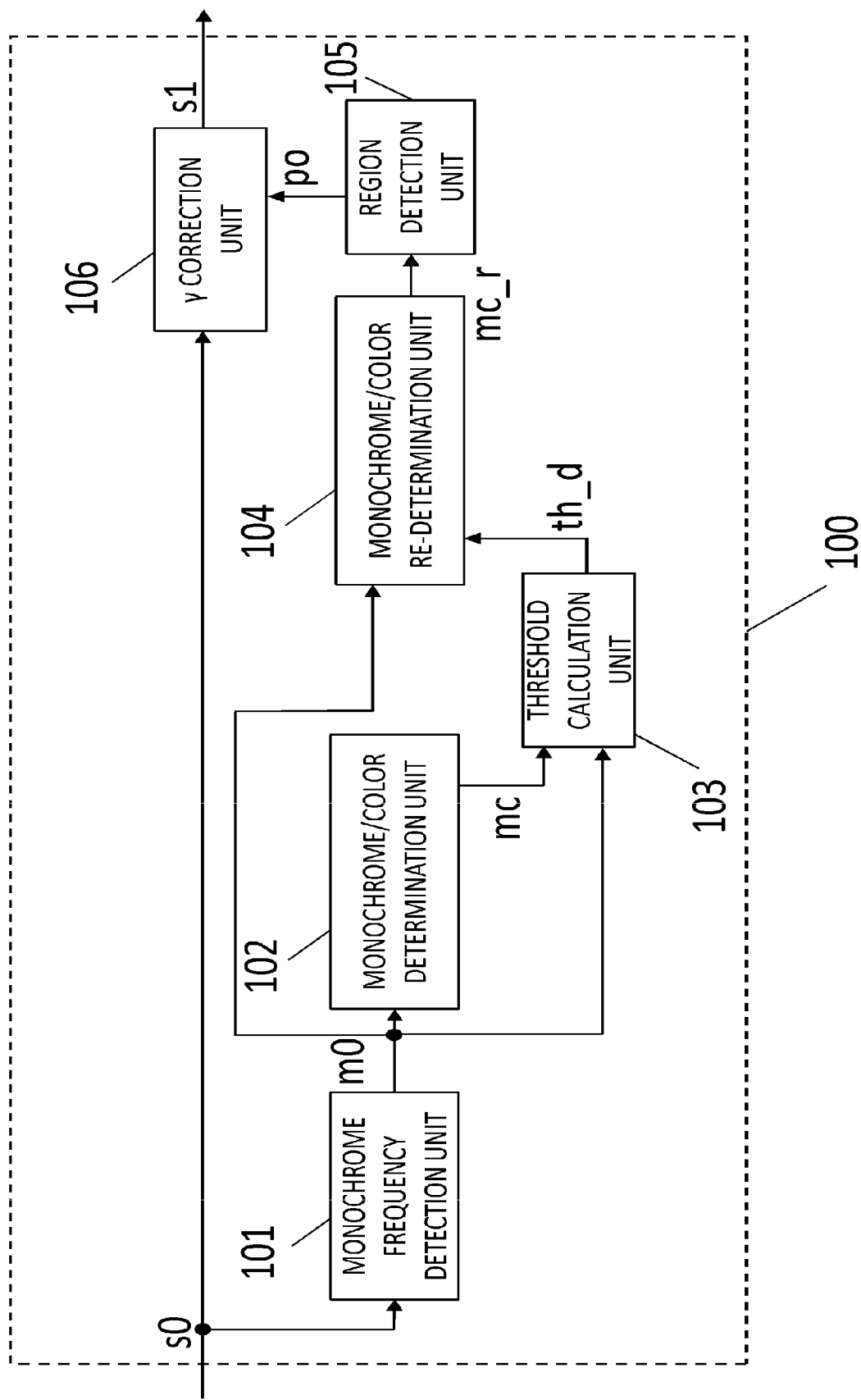
FIG. 1 is a block diagram illustrating an example of the functional configuration of the image processing apparatus according to Embodiment 1.

FIG. 1 is a block diagram illustrating an example of the functional configuration of the image processing apparatus according to the present embodiment. An image processing apparatus 100 according to the present embodiment has a monochrome frequency detection unit 101, a monochrome/color determination unit 102, a threshold calculation unit 103, a monochrome/color re-determination unit 104, a region detection unit 105, and a γ correction unit 106. In the image processing apparatus according to the present embodiment, image data s0 (input image) is inputted from a personal computer (not shown in the figure). Further, the image processing apparatus according to the present embodiment generates image data s1 by performing γ correction with respect to the image data s0 and outputs the generated image data to a display panel (not shown in the figure). As a result, an image based on the image data s1 can be displayed on the display panel. In the present embodiment, image data s0, s1 are assumed to be RGB data.

The display panel may be part of the image processing apparatus or may be an apparatus separate from the image processing apparatus.

Further, the image data are not necessarily the RGB data. For example, the image data may be YCbCr data.

The monochrome frequency detection unit 101 acquires the statistical value of pixel values for each divided region obtained by dividing the input image (image data s0). More specifically, the monochrome frequency detection unit 101 counts the number (monochrome frequency m0) of the monochrome pixels in a divided region for each divided region. In the present embodiment, the monochrome frequency detection unit 101 determines a pixel in which an R value, a G value, and a B value are all the same as a monochrome pixel and counts the monochrome frequency m0. This method for determining whether a pixel is a monochrome pixel is not limiting. For example, it is also possible to convert RGB data into color difference data and determine a pixel with a color difference equal to zero as a monochrome pixel.

Figure 2:
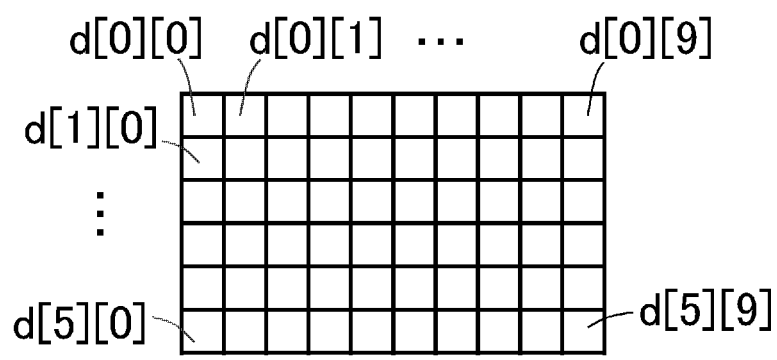
FIG. 2 illustrates an example of the divided region according to Embodiment 1.

In the present embodiment, as shown in FIG. 2, each of 60 regions d[0][0] to d[5][9] obtained by dividing the input image into 10 regions in the horizontal direction and 6 regions in the vertical direction is taken as the abovementioned divided region. Therefore, in the monochrome frequency detection unit 101, a total of 60 monochrome frequencies m0 are obtained for the input image of one frame. The monochrome frequencies m0 of the divided regions d[0][0] to d[5][9] are described as monochrome frequencies m0[0][0] to m0[5][9]. For example, the monochrome frequency m0 of the divided region d[0][0] is described as the monochrome frequency m0[0][0].

The monochrome frequency detection unit 101 outputs the monochrome frequency m0 for each divided region to the monochrome/color determination unit 102, threshold calculation unit 103, and monochrome/color re-determination unit 104.

In the present embodiment, the statistical value is taken as the monochrome frequency, but the statistical value is not limited thereto. For example, the statistical value may be pixel values of all of the pixels including monochrome pixels and color pixels, the number of color pixels, or a histogram for each pixel value. Essentially, any statistical value may be used, provided that this value makes it possible to determine whether the divided region is a monochrome region or a color region.

Further, in the present embodiment, it is assumed that the statistical value is generated by the monochrome frequency detection unit 101, but the statistical value may be also inputted (acquired) from the outside.

The number of divided regions is not limited to 60. For example, the number of divided regions may be less or greater than 60, for example, 30 or 80. The divided regions may be of any size.

The monochrome/color determination unit 102 compares the statistical value (monochrome frequency m0) of a divided region acquired from the monochrome frequency detection unit 101 with a first threshold for each divided region to determine whether the divided region is a color region of a monochrome region. In the present embodiment, the monochrome/color determination unit 102 determines that the divided region is a monochrome region when the monochrome frequency m0 is equal to or greater than a threshold th (first threshold) and determines that the divided region is a color region when the monochrome frequency is less than the threshold th.

The threshold th is a value that is set, for example, so that the divided region is determined as a monochrome region even if a certain number of color pixels are present, with consideration for a color annotation present in the monochrome image. In the present embodiment, the threshold th is assumed to be determined such that a divided region for which the ratio of the monochrome frequency to the total number of pixels in the divided region is equal to or greater than 95% is determined as a monochrome region, and a divided region for which the abovementioned ratio is less than 95% is determined as a color region. For example, where the size of a divided region is 384 pixels in the horizontal direction by 400 pixels in the vertical direction, the threshold this 145920 (=384×400×0.95).

The monochrome/color determination unit 102 outputs the determination result indicating whether the divided region is a color region or a monochrome region (monochrome/color determination result mc) to the threshold calculation unit 103. In the case of a monochrome region, the monochrome/color determination result mc=1, and in the case of a color region, the monochrome/color determination result mc=0. The monochrome/color determination results mc for divided regions d[0][0] to d[5][9] are described as monochrome/color determination results mc[0][0] to mc[5][9]. For example, the monochrome/color determination result mc of the divided region d[0][0] is described as the monochrome/color determination result mc[0][0].

The threshold calculation unit 103 calculates a second threshold on the basis of the statistical value (monochrome frequency m0) of pixel values of an adjacent divided region and the statistical value of pixel values of a peripheral divided region for each adjacent divided region. The adjacent divided region is a divided region, from among the divided regions that are determined by the monochrome/color determination unit 102 to be monochrome regions, which is adjacent to the divided region determined by the monochrome/color determination unit 102 to be a color region. The peripheral divided region is a region, from among the divided regions that are determined by the monochrome/color determination unit 102 to be monochrome regions, which is on the periphery of the adjacent divided region that is the calculation object of the second threshold. The second threshold is a threshold by which a divided region is more likely determined as a color region than by the first threshold.

In the present embodiment, the threshold calculation unit 103 calculates the threshold th_d for all of the divided region. Therefore, in the present embodiment, a total of thresholds th_d are obtained. The thresholds calculated with respect to the adjacent divided regions, from among the thresholds th_d calculated by the threshold calculation unit 103, correspond to the above-mentioned second thresholds.

The threshold calculation unit 103 outputs the threshold th_d to the monochrome/color re-determination unit 104.

Figure 3:
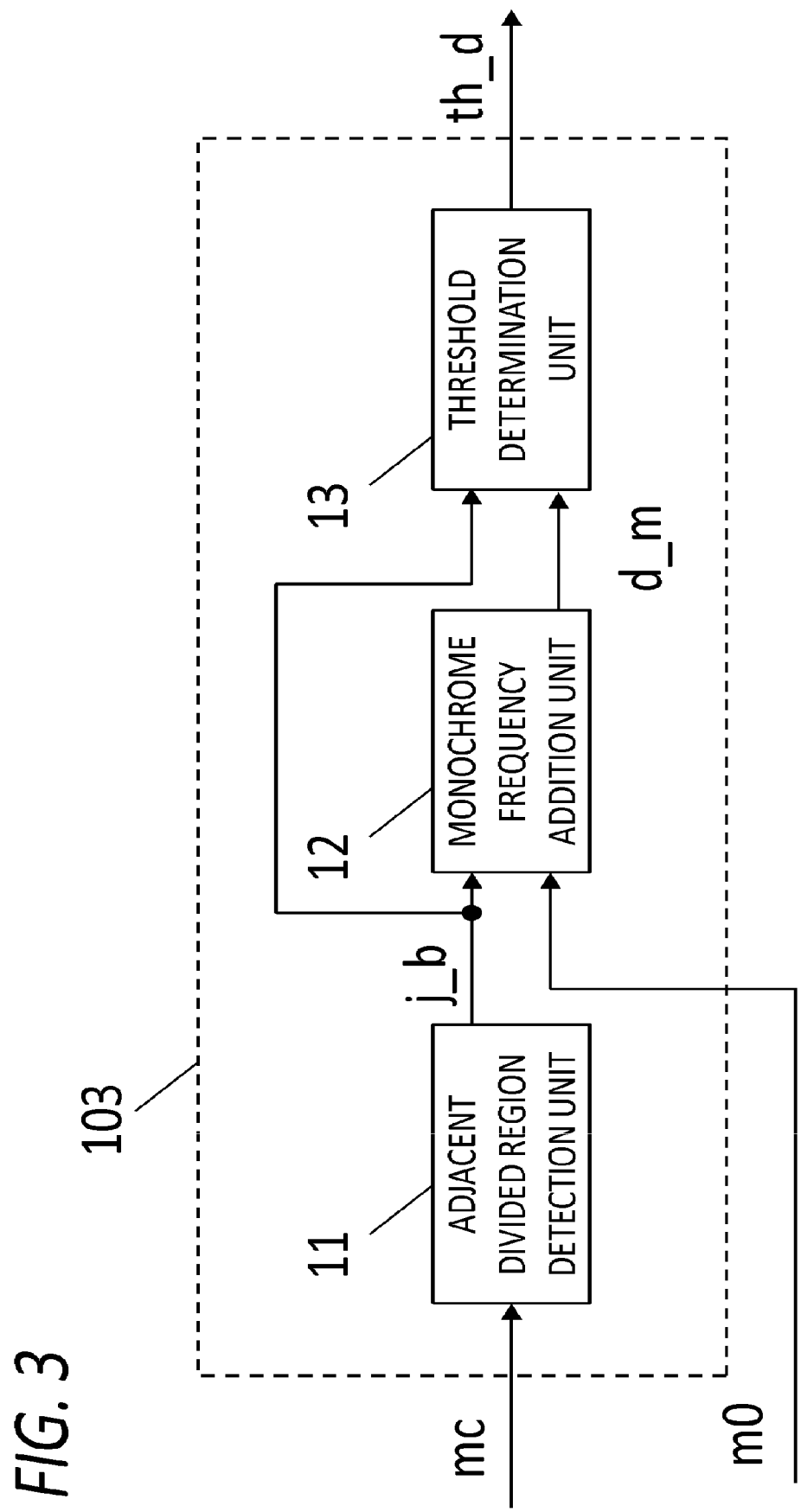
FIG. 3 is a block diagram illustrating an example of the detailed configuration of the threshold calculation unit according to Embodiment 1.

The configuration of the threshold calculation unit 103 is shown in greater detail in FIG. 3. The threshold calculation unit 103 has an adjacent divided region detection unit 11, a monochrome frequency addition unit 12, and a threshold determination unit 13.

The adjacent divided region detection unit 11 detects an adjacent divided region by using the monochrome/color determination result mc.

The adjacent divided region detection unit 11 then outputs the determination result that determines whether the divided region is an adjacent divided region (adjacent divided region determination result j_b) to the monochrome frequency addition unit 12. The adjacent divided region determination results j_b of the divided regions d[0][0] to d[5][9] are described as adjacent divided region determination results j_b[0][0] to j_b[5][9]. For example, the adjacent divided region determination result j_b of the divided region d[0][0] is described as the adjacent divided region determination result j_b[0][0].

In the present embodiment, the adjacent divided region determination results j_b are obtained with Formula (1) below. Thus, when the divided region is an adjacent divided region, the adjacent divided region determination result j_b is taken to be equal to 1 or 2, and where the divided region is not the adjacent divided region, the adjacent divided region determination result j_b is taken to be equal to 0. More specifically, in the case of an adjacent divided region that is adjacent in the horizontal direction to the divided region determined by the monochrome/color determination unit 102 to be a color region, the adjacent divided region determination result j_b is taken to be equal to 1. In the case of an adjacent divided region that is adjacent in the vertical direction to the divided region determined by the monochrome/color determination unit 102 to be a color region, the adjacent divided region determination result j_b is taken to be equal to 2. In the present embodiment, in the case of an adjacent divided region that is adjacent in the vertical and horizontal directions to the divided region determined to be a color region, the adjacent divided region determination result j_b is taken to be equal to 1.

When $mc[Y][X]=1$ and $mc[Y][X+1]=0, j\_b\,[Y][X]=1$. (1)

When $mc[Y][X]=1$ and $mc[Y][X-1]=0, j\_b[Y][X]=1$. (2)

When $mc[Y][X]=1$ and $mc[Y+1][X]=0, j\_b\,[Y][X]=2$. (3)

When $mc[Y][X]=1$ and $mc[Y-1][X]=0, j\_b[Y][X]=2$. (4)

When condition (1) or (2) is fulfilled and the condition (3) or (4) is fulfilled, $j\_b[Y][X]=1$. (5)

In other cases, $j\_b[Y][X]=0$. (6)

X: position of the divided region in the horizontal direction.

Y: positive of the divided region in the vertical direction. Formula (1)

The monochrome frequency addition unit 12 calculates the number of monochrome pixels in a region obtained by combining the adjacent divided region with the peripheral divided region of this adjacent divided region for each adjacent divided region from the monochrome frequency m0 and the adjacent divided region determination result j_b. The above-mentioned region obtained by combining the adjacent divided region with the peripheral divided region is a region of a boundary periphery of the divided region determined by the monochrome/color determination unit 102 as a color region and a divided region determined as a monochrome region. Accordingly, in the present embodiment, the region obtained by combining the adjacent divided region with the peripheral divided region is described as a boundary peripheral region, and the number of monochrome pixels in the boundary peripheral region is described as a boundary peripheral region monochrome frequency d_m.

The monochrome frequency addition unit 12 outputs the boundary peripheral region monochrome frequency d_m to the threshold determination unit 13.

In the present embodiment, the boundary peripheral region monochrome frequency d_m is also determined with respect to the divided regions other than the adjacent divided regions. More specifically, the boundary peripheral region monochrome frequency d_m of the divided regions other than the adjacent divided regions is taken as 0. The boundary peripheral region monochrome frequencies d_m of the divided regions d[0][0] to d[5][9] are described as boundary peripheral region monochrome frequencies d_m[0][0] to d_m[5][9]. For example, the boundary peripheral region monochrome frequency d_m of the divided region d[0][0] is described as a boundary peripheral region monochrome frequency d_m[0][0].

The monochrome frequency addition unit 12 calculates the boundary peripheral region monochrome frequencies d_m by Formula (2) below.

[Math. 1]

When $j\_b[Y][X]=1$ and a divided region with $mc=1$ is adjacent in the rightward direction, (1)

$$d\_m[Y][X] = \sum_{i=0}^{k} m0[Y][X + i].$$

When $j\_b[Y][X]=1$ and a divided region with $mc=1$ is adjacent in the leftward direction, (2)

$$d\_m[Y][X] = \sum_{i=0}^{k} m0[Y][X - i].$$

When $j\_b[Y][X]=1$ and a divided region with $mc=1$ is not adjacent in the horizontal direction, (3)

$d\_m[Y][X]=m0[Y][X]$.

When $j\_b[Y][X]=2$ and a divided region with $mc=1$ is adjacent in the downward direction, (4)

$$d\_m[Y][X] = \sum_{i=0}^{k} m0[Y + i][X].$$

When $j\_b[Y][X]=2$ and a divided region with $mc=1$ is adjacent in the upward direction, (5)

$$d\_m[Y][X] = \sum_{i=0}^{k} m0[Y - i][X].$$

When $j\_b[Y][X]=2$ and a divided region with $mc=1$ is not adjacent in the vertical direction, (6)

$d\_m[Y][X]=m0[Y][X]$.

When $j\_b[Y][X]=0$, $$d\_m[Y][X]=0. \quad (7)$$

X: position of the divided region in the horizontal direction.

Y: positive of the divided region in the vertical direction.

k: number of divided regions with $mc=1$ that are continuous with respect to the adjacent divided region. Formula (2)

A specific example of a method for calculating the boundary peripheral region monochrome frequency d_m will be explained below with reference to FIG. 4. In FIG. 4, the regions surrounded by solid lines (thin lines) are the divided regions determined by the monochrome/color determination unit 102 as monochrome regions, and the regions surrounded by solid lines (thick lines) are the divided regions determined as color regions.

In the divided region d[1][4] shown in FIG. 4, the adjacent divided region determination result j_b=1. The divided regions with mc=1 that are continuous in the horizontal direction with respect to the divided region d[1][4] are the divided regions d[1][5] to d[1][9]. In the present embodiment, the region in which the divided regions d[1][4] to d[1][9] are combined (the region surrounded by a broken line in FIG. 4) is a boundary peripheral region with respect to the divided region d[1][4]. The sum total of the monochrome frequencies m0[1][4] to m0[1][9] of the divided regions d[1][4] to d[1][9] is taken as a boundary peripheral region monochrome frequency d_m [1][4] of the divided region d[1][4].

Further, in the divided region d[0][2], the adjacent divided region determination result j_b=2. There is no divided region with mc=1 which is continuous in the vertical direction with respect to the divided region d[0][2]. Therefore, the divided region d[0][2] is taken as a boundary peripheral region with respect to the divided region d[0][2]. The monochrome frequency m0[0][2] of the divided region d[0][2] is taken as a boundary peripheral region monochrome frequency d_m [0][2] of the divided region d[0][2].

In the present embodiment, an example is explained in which a boundary peripheral region monochrome frequency d_m is calculated by taking a divided region continuous in the horizontal or vertical direction with respect to the adjacent divided region as a peripheral divided region, but the peripheral divided region is not limited to such a selection. The peripheral divided region may be any divided region on the periphery of the adjacent divided region, from among the divided regions determined by the monochrome/color determination unit 102 to be monochrome regions. For example, a divided region within a range at a predetermined distance from an adjacent divided region, from among the divided regions determined by the monochrome/color determination unit 102 to be monochrome regions, may be taken as a peripheral divided region of the adjacent divided region.

The threshold determination unit 13 calculates for each divided region the threshold th_d from the adjacent divided region determination result j_b and the boundary peripheral region monochrome frequency d_m. The threshold determination unit 13 then outputs the threshold th_d to the monochrome/color re-determination unit 104.

In the present embodiment, the threshold th_d (second threshold) is calculated with respect to the adjacent divided region on the basis of the ratio of the number of monochrome pixels to the total number of pixels in the boundary peripheral region. More specifically, the threshold th_d is calculated such that the threshold th_d calculated when the ratio is large becomes a threshold by which a divided region is more likely determined as a color region than by the threshold th_d calculated when the ratio is small. In the present embodiment, the larger is the threshold th_d, the more likely it is to determine that a divided region is a color region. Therefore, in the present embodiment, the threshold th_d calculated when the ratio is large is made larger than the threshold th_d calculated when the ratio is small.

In the present embodiment, the threshold determination unit 13 calculates the threshold th_d by Formula (3) below. A constant g1 is determined in advance, for example, by the manufacturer or user. The value of the constant g1 may be changed by the user.

When $j\_b=1$ or 2, $th\_d=th+(d\_m/d\_all)\times(1-th)\times g1$. (1)

When $j\_b=0$, $th\_d=th$. (2)

d_all: total number of pixels in the boundary peripheral region.

g1: constant. Formula (3)

The monochrome/color re-determination unit 104 compares the statistical value (monochrome frequency m0) of the adjacent divided region with the second threshold (threshold th_d) for each adjacent divided region and re-determines whether this adjacent divided region is a color region or a monochrome region. In the present embodiment, the monochrome/color re-determination unit 104 re-determines whether a divided region is a color region or a monochrome region with respect to all of the divided regions. When the monochrome frequency m0 is equal to or greater than the threshold th_d, the monochrome/color re-determination unit 104 re-determines that the threshold is a monochrome region, and when the monochrome frequency is less than the threshold th_d, the monochrome/color re-determination unit re-determines a color region.

The monochrome/color re-determination unit 104 then outputs the results obtained in re-determining whether the divided regions are color regions or monochrome regions (monochrome/color re-determination results mc_r) to the region detection unit 105. In the case of a monochrome region, the monochrome/color re-determination result mc_r=1, and in the case of a color region, the monochrome/color re-determination result mc_r=0.

In color images such as medical images, the background pixels are mostly monochrome pixels. Therefore, it is highly probable that the adjacent divided region is a divided region erroneously determined as a monochrome region although it is a color region. As mentioned hereinabove, the second threshold is a threshold by which the divided region is more likely to determine as a color region than by the first threshold. By performing the re-determination by using such a second threshold, it is possible to reduce the abovementioned erroneous determination.

However, it is also possible that the adjacent divided region is a monochrome region including a certain number of color pixels (color pixels constituting an annotation or the like). It is highly probable that such an annotation is present not only in the adjacent divided region, but also in the peripheral divided region of the adjacent divided region. Therefore, when the ratio of the number of monochrome pixels to the total number of pixels in the boundary peripheral region is small, it is highly probable that the adjacent divided region will be a monochrome region including a certain number of color pixels. Meanwhile, when the abovementioned ratio is large, it is highly probable that the adjacent divided region is a divided region erroneously determined as a monochrome region although it is a color region. In the present embodiment, as mentioned hereinabove, the threshold th_d calculated when the above-mentioned ratio is large is made larger than the threshold th_d calculated when the ratio is small. Therefore, the adjacent divided region which is highly probable to be a color region can be easily re-determined as a color region. As a result, it is possible to determine with better accuracy as to whether the adjacent divided region is a color region or a monochrome region. More specifically, the adjacent divided region which is highly probable to be a color region can be re-determined as a color region, and an adjacent divided region which is highly probable to be a monochrome region including a certain number of color pixels can be re-determined as a monochrome region.

The effect obtained in the present embodiment will be explained below on the basis of a specific example.

Figure 5A:
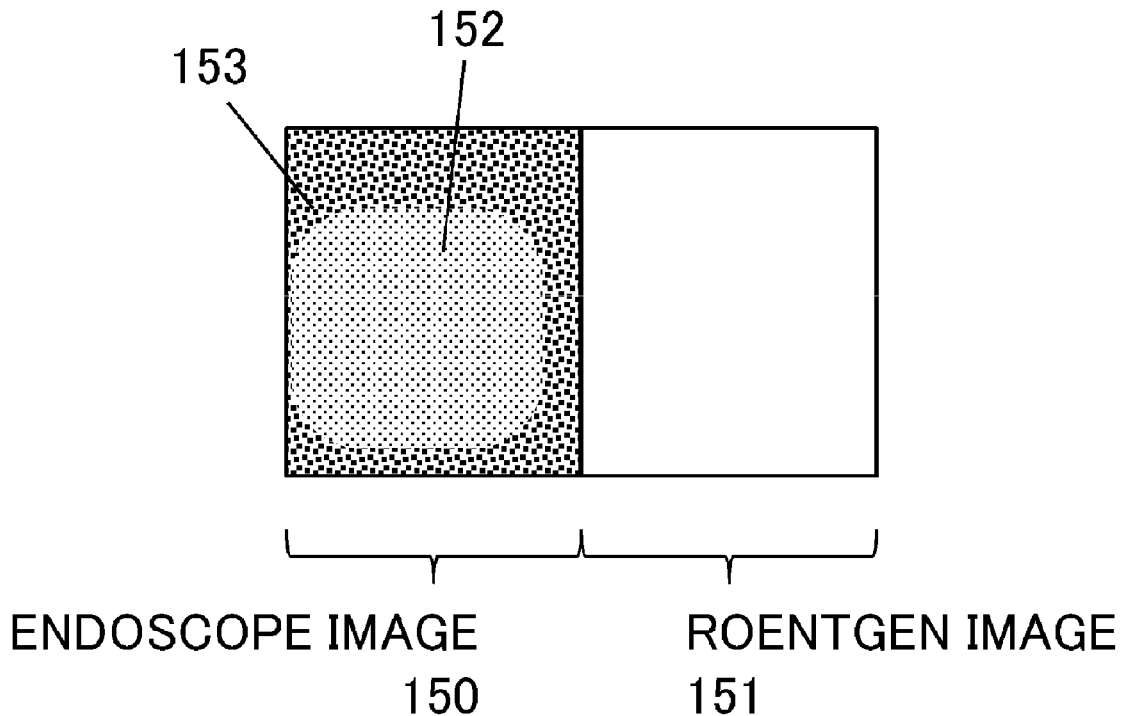
FIGS. 5A and 5B illustrate an example of the effect obtained in Embodiment 1.

FIG. 5A illustrates an example of an input image. In the example shown in FIG. 5A, in the input image, an endoscope image 150 is arranged on the left side and a Roentgen image 151 is arranged on the right side. The Roentgen image 151 is a monochrome image (image constituted by pixels with R value=G value=B value). Further, the endoscope image 150 is constituted by a foreground section 152 which is a region of the image picked up by the endoscope and a background section 153 which includes other regions. The pixels of the foreground sections 152 are all color pixels, and the pixels of the background section 153 are monochrome pixels (in the present embodiment, pixels with R value=G value=B value=0). The color image and monochrome image are not limited to the medical images. For example, the color image may be an image of an application for displaying an image, an icon, a graphic, or the like.

Figure 5B:
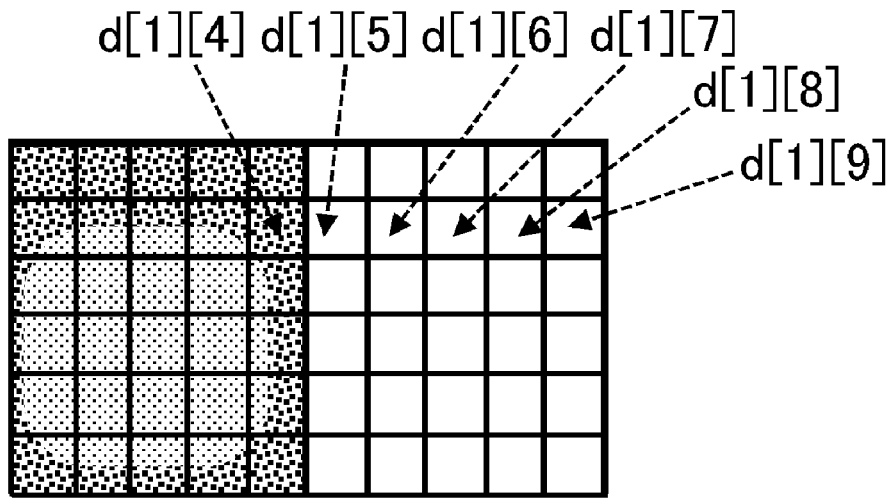

In this case, where the threshold th is used to determine whether a divided region is a color region or a monochrome image for each divided region, the divided region positioned at the end, from among the divided regions including the foreground section 152, is erroneously determined as a monochrome region. For example, the divided region d[1][4] shown in FIG. 5B includes color pixels constituting the foreground 152, but since the ratio of monochrome pixels is high, this divided region is erroneously determined as a monochrome region.

In the present embodiment, the threshold th_d by which a divided region is more likely determined as a color region than by the threshold th is calculated with respect to such a divided region, and whether the divided region is a color region or a monochrome image is re-determined using this threshold th_d. In the example shown in FIG. 5B, the region in which the divided regions d[1][4] to d[1][9] are combined is taken as a boundary peripheral region for the divided region d[1][4]. Since the divided regions d[1][5] to d[1][9] do not include color pixels, the ratio of the number of color pixels to the total number of pixels in the boundary peripheral region is large. Therefore, it can be determined that the divided region d[1][4] is highly probable to be a region that has been erroneously determined as a monochrome region although it is a color region, and the threshold th_d of the divided region [1][4] is increased. As a result, the divided region d[1][4] is correctly re-determined as a color region.

The region detection unit 105 divides the input image into a color region and a monochrome region. More specifically, the region detection unit 105 determines a color region constituted by a divided region that has been re-determined as a color region on the basis of the monochrome/color re-determination result mc_r and outputs coordinate information po representing the determined color region to the γ correction unit 106. In the present embodiment, the coordinate information po is assumed to include an upper left coordinate (x coordinate (coordinate in the horizontal direction), y coordinate (coordinate in the vertical direction)) which is a start point of the color region and a lower right coordinate (x coordinate, y coordinate) which is the end point.

Figure 6:
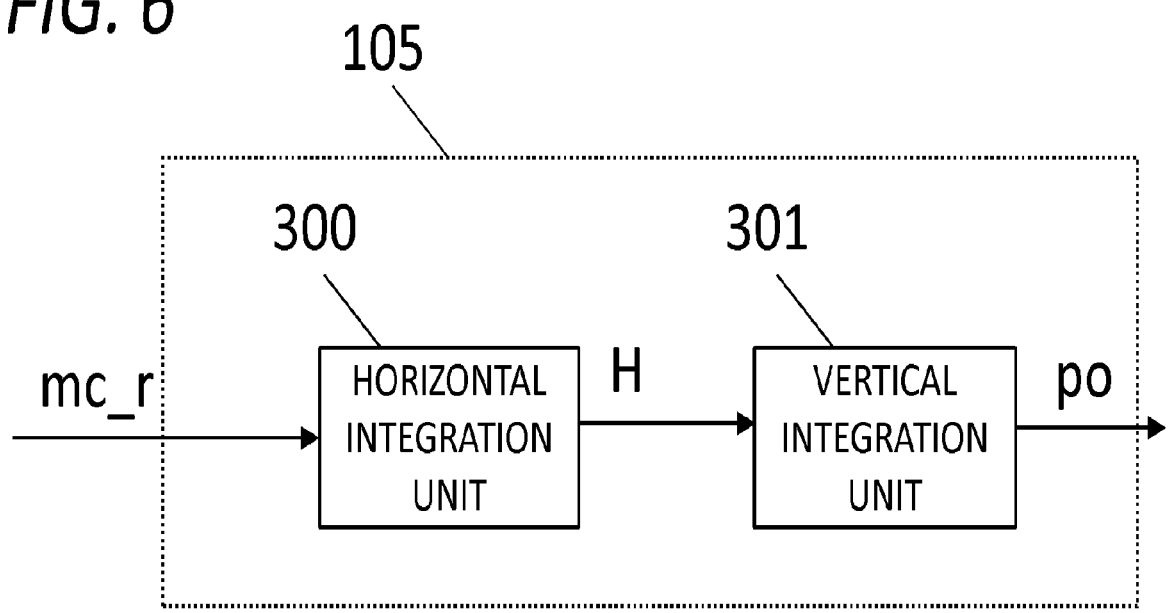
FIG. 6 is a block diagram illustrating an example of the detailed configuration of the region detection unit according to Embodiment 1.

FIG. 6 is a block diagram illustrating in detail the configuration of the region detection unit 105. The region detection unit 105 has a horizontal integration unit 300 and a vertical integration unit 301.

The horizontal integration unit 300 produces a single color region by integrating a plurality of color regions (a plurality of divided regions re-determined as color regions) continuous in the horizontal direction. The horizontal integration unit 300 outputs the coordinate Hs[Y] in the horizontal direction (x coordinate) of the left end and the x coordinate He[Y] of the right end of the integrated color region.

The vertical integration unit 301 produces a single color region by integrating a plurality of color regions (a plurality of divided regions obtained by integration in the horizontal integration unit 300) continuous in the vertical direction. The vertical integration unit 301 outputs coordinate information po representing the upper left coordinate and lower right coordinate of the integrated color region.

Figure 7A:
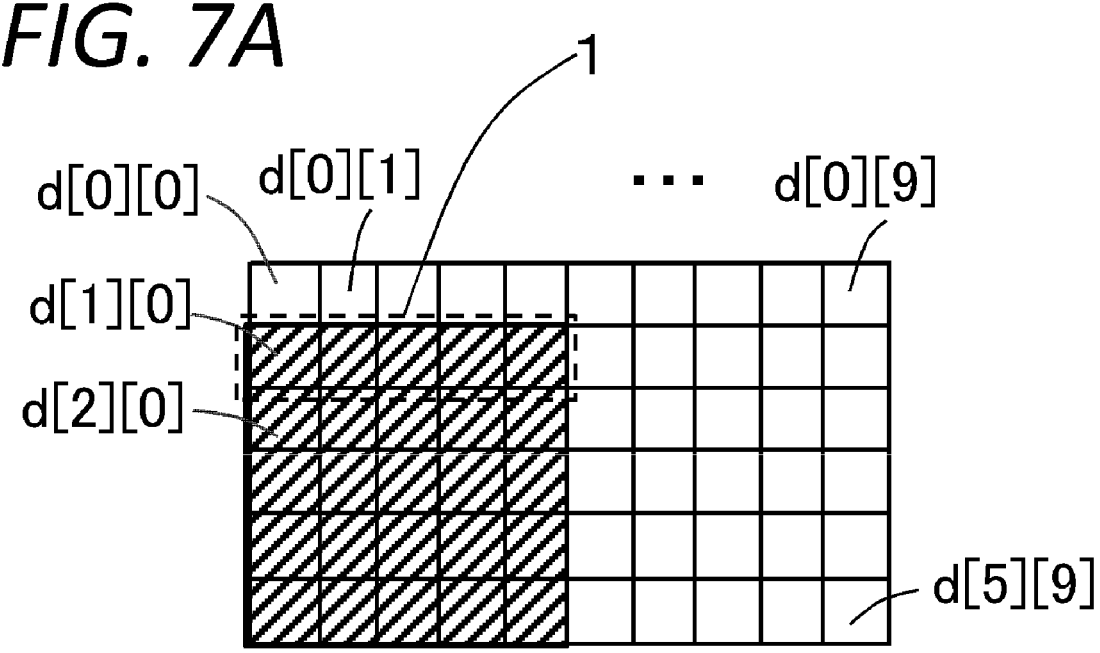
FIGS. 7A and 7B illustrate a specific example of processing performed by the region detection unit according to Embodiment 1.
Figure 7B:
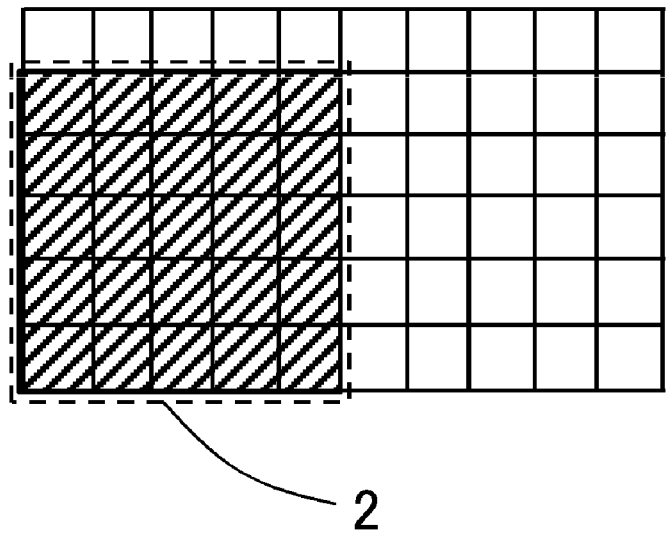

A specific example of processing performed by the horizontal integration unit 300 and the vertical integration unit 301 will be explained below with reference to FIGS. 7A and 7B. The divided regions shown by white color in FIGS. 7A and 7B are the divided regions re-determined as monochrome regions, and the divided regions shown by oblique hatching are the divided regions re-determined as color regions. In FIGS. 7A and 7B, the upper left coordinate of the input image is assumed to be a point of origin (0, 0), and the lower right coordinate is assumed to be (1919, 1199). Further, the divided region is assumed to have a size of 192 pixels in the horizontal direction by 200 pixels in the vertical direction.

The processing performed by the horizontal integration unit 300 is explained below.

First, the horizontal integration unit 300 scans the divided regions d[0][0] to d[0][9] with the position Y=0 in the vertical direction from left to right and integrates continuous color regions, provided that such are present. In the example shown in FIG. 7A, no color regions are present among the divided regions d[0][0] to d[0][9] and, therefore, no integration is performed.

Then, the horizontal integration unit 300 scans the divided regions d[1][0] to d[1][9] with the position Y=1. In the example shown in FIG. 7A, the divided regions d[1][0] to d[1][4] are color regions. Therefore, the horizontal integration unit 300 integrates those five divided regions d[1][0] to d[1][4] to obtain a single color region. The region 1 shown by a broken line in FIG. 7A is a color region obtained by integrating the divided regions d[1][0] to d[1][4]. The x coordinate Hs[1] of the left end and the x coordinate He[1] of the right end of the color region 1 have the following values.

Hs[1]=0
He[1]=959

In this case, the x coordinate He[1] of the right end equal to 959 is obtained by subtracting 1 from 192×5=960, which is the size of the five divided regions in the horizontal direction.

The horizontal integration unit 300 then performs similar processing also with respect to the divided regions d[2][0] to d[2][9], divided regions d[3][0] to d[3][9], divided regions d[4][0] to d[4][9], and divided regions d[5][0] to d[5][9]. As a result, the following values are obtained.

Hs[2]=0
He[2]=959

Hs[3]=0
He[3]=959
Hs[4]=0
He[4]=959
Hs[5]=0
He[5]=959

The processing performed in the vertical integration unit 301 is explained below.

The vertical integration unit 301 integrates the color regions continuous in the vertical direction by using the coordinate values outputted from the horizontal integration unit 300.

In the example shown in FIG. 7A, the values of the x coordinates Hs[1] to Hs[5] of the left ends of the color regions outputted from the horizontal integration unit 300 are equal to each other. Further, the values of x coordinates He[1] to He[5] of the right ends of the color regions are also equal to each other. Therefore, the five color regions obtained in the horizontal integration unit 300 have equal horizontal positions and horizontal dimensions and are continuous in the vertical direction. In the present embodiment, such a plurality of color regions is integrated into a single color region.

As a result of the processing performed in the vertical integration unit 301, a total of 25 divided regions d[1][0] to d[1][4], d[2][0] to d[2][4], d[3][0] to d[3][4], d[4][0] to d[4][4], and d[5][0] to d[5][4], are integrated and a single color region (region 2 shown by a broken line in FIG. 7B) is obtained.

The vertical integration unit 301 then outputs the coordinate information po representing the upper left coordinate and lower right coordinate of the integrated color region 2. In the case shown in FIG. 7B, the information po is as follows.

po=((upper left x coordinate, upper left y coordinate), (lower right x coordinate, lower right y coordinate))=((0, 200), (959, 1199))

The γ correction unit 106 performs individual γ correction with respect to the color regions and monochrome regions on the basis of the coordinate information po. Since the regions designated by the coordinate information po are color regions, the 2.2γ correction (γ correction with γ=2.2) is applied. Other regions are determined as monochrome regions, and the DICOM γ correction (γ correction stipulated by digital imaging and communication in medicine (DICOM) Part 14) is applied.

In the present embodiment, an example is explained in which the image processing performed individually with respect to color regions and monochrome regions is the γ correction, but this image processing is not limiting. Thus, the image processing may be lightness adjustment processing or color temperature adjustment processing.

As mentioned hereinabove, in the present embodiment, it is re-determined whether the adjacent divided region is a color region or a monochrome region by using the second threshold by which the divided region is more likely determined as a color region than by the first threshold. As a result, a divided region that has been erroneously determined as a monochrome region, although it is a color region, can be correctly re-determined as a color region, and the occurrence of a tradeoff, such that where either of a monochrome region and a color region is determined correctly, the other is determined erroneously, can be inhibited.

Further, in the present embodiment, the configuration is used in which the second threshold is calculated on the basis of the statistical value of pixel values in the adjacent divided region and the statistical value of pixel values in peripheral divided region for each adjacent divided region, but such a configuration is not limiting. The second threshold may be any threshold, provided that the divided region is more likely determined as a color region by using this threshold than the first threshold. For example, the value of the second threshold may be shared among a plurality of adjacent divided regions. The second threshold may have a preset value.

Further, in the present embodiment, the configuration is used in which the threshold th_d is calculated with respect to all of the divided regions and the re-determination is performed with respect to all of the divided regions, but such a configuration is not limiting. For example, it is possible to calculate the threshold th_d only with respect to the adjacent divided regions and perform the re-determination only with respect to the adjacent divided regions.

Embodiment 2

An image processing apparatus and a control method therefor according to Embodiment 2 will be explained below.

Figure 8:
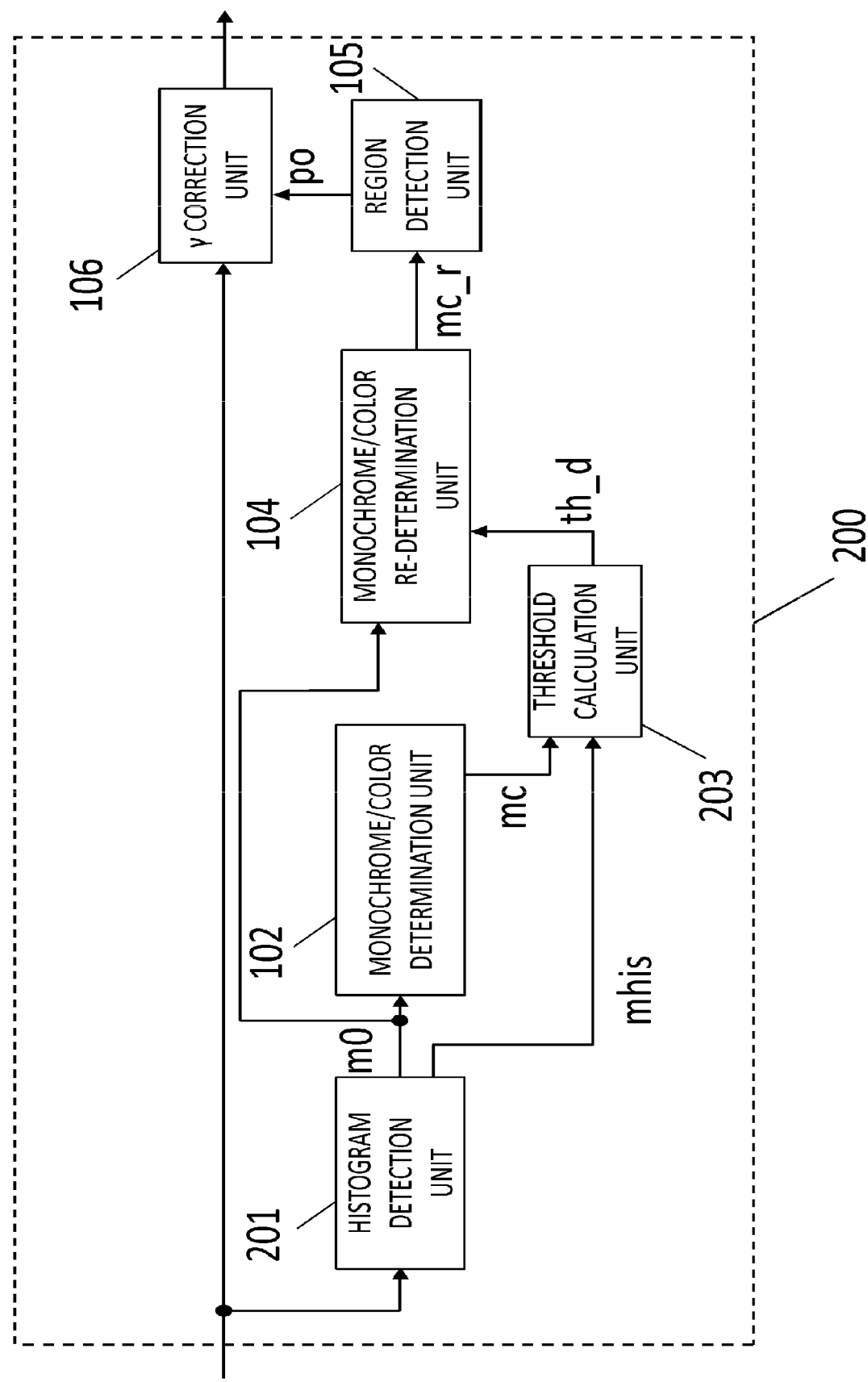
FIG. 8 is a block diagram illustrating an example of the functional configuration of the image processing apparatus according to Embodiment 2.

FIG. 8 is a block diagram illustrating an example of the functional configuration of the image processing apparatus according to the present embodiment. An image processing apparatus 200 according to the present embodiment has a histogram detection unit 201, a monochrome/color determination unit 102, a threshold calculation unit 203, a monochrome/color re-determination unit 104, a region detection unit 105, and a γ correction unit 106. Functions similar to those of Embodiment 1 are assigned with like reference numerals and the explanation thereof is herein omitted.

The histogram detection unit 201 generates (acquires) histograms of pixel values as a statistical value of pixel values for each divided region. In the present embodiment, the histogram detection unit 201 generates histograms of brightness values of monochrome pixels (monochrome pixel histogram mhis) for each divided region. The brightness value is, for example, an average value of the R value, G value, and B value.

In the present embodiment, similarly to Embodiment 1, each of 60 divided regions d[0][0] to d[5][9] obtained by dividing the input image by 10 in the horizontal direction and 6 in the vertical direction is assumed to be the divided region. The monochrome pixel histograms mhis of the divided regions d[0][0] to d[5][9] are described as monochrome pixel histograms mhis [0][0] to mhis [5][9]. The frequency of each brightness value in the monochrome pixel histograms mhis [X][Y] is described as mhis [Y][X][ydata]. For example, the frequency of a monochrome pixel with a brightness value 10 in the divided region d[0][0] is described as mhis[0][0][10].

The histogram detection unit 201 outputs the total frequency (that is, the monochrome frequency m0) of the monochrome pixel histograms mhis to the monochrome/color determination unit 102 and outputs the monochrome pixel histogram mhis to the threshold calculation unit 203.

In the present embodiment, the brightness value is taken as a 0 to 255 gradation value.

A method for determining whether a pixel is a monochrome pixel is similar to the determination method used in the monochrome frequency detection unit 101 of Embodiment 1.

The threshold calculation unit 203 calculates the threshold th_d from the monochrome pixel histogram mhis and monochrome/color determination result ms. The threshold calculation unit 203 outputs the calculated threshold th_d to the monochrome/color re-determination unit 104.

Figure 9:
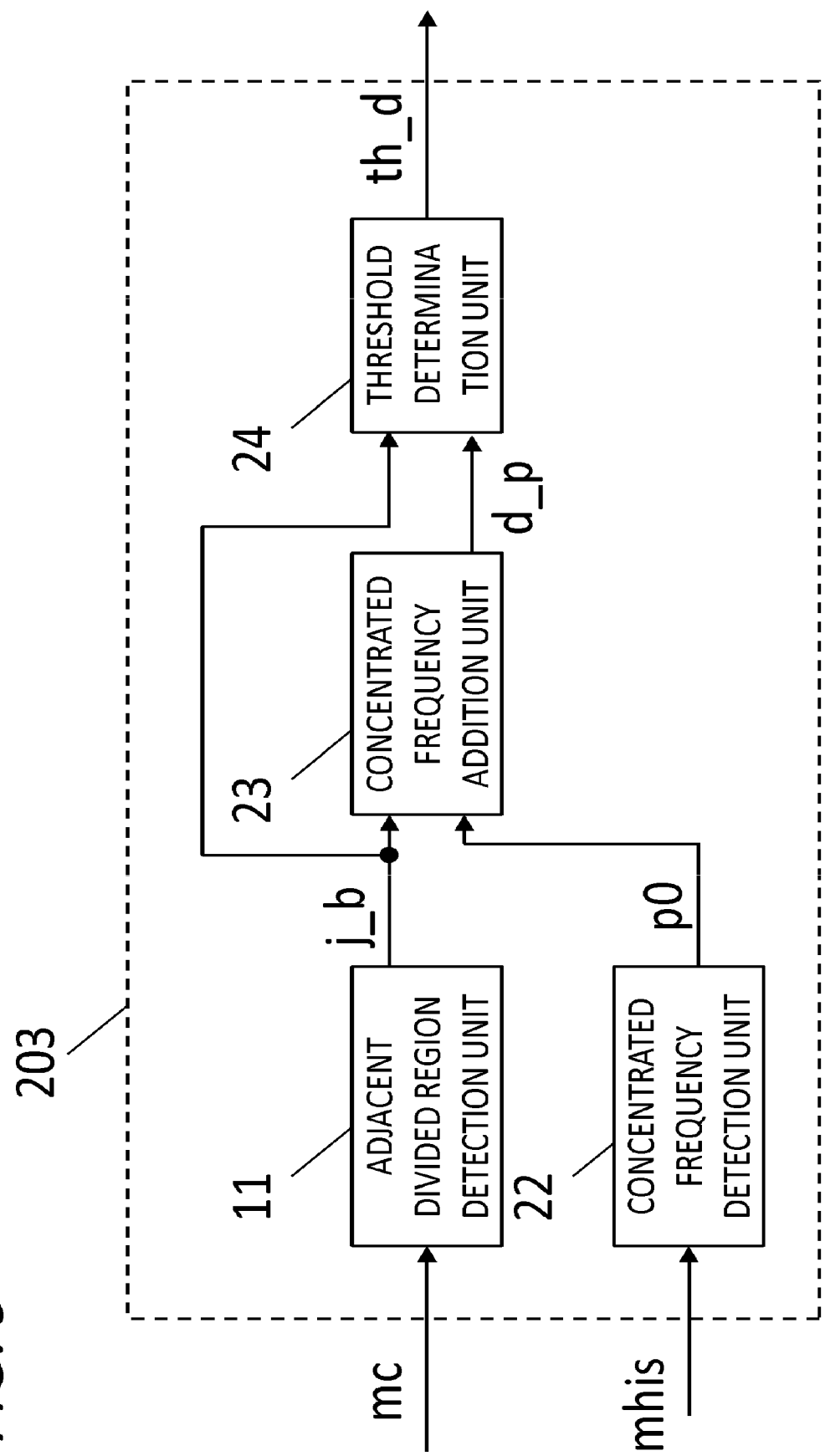
FIG. 9 is a block diagram illustrating an example of the detailed configuration of the threshold calculation unit according to Embodiment 2.

The configuration of the threshold calculation unit 203 is shown in detail in FIG. 9. The threshold calculation unit 203 has an adjacent divided region detection unit 11, a concentrated frequency detection unit 22, a concentrated frequency addition unit 23, and a threshold determination unit 24.

The adjacent divided region detection unit 11 performs the processing similar to that of Embodiment 1.

The concentrated frequency detection unit 22 calculates a concentrated frequency p0 from the monochrome pixel histogram mhis of a divided region for each divided region. The concentrated frequency detection unit 22 then outputs the calculated concentrated frequency p0 to the concentrated frequency addition unit 23.

The concentrated frequency p0 is the frequency of a gradation value with a concentrated frequency (gradation value for which the frequency is much higher than in the surrounding area) in the monochrome pixel histogram mhis. For example, when the monochrome pixel histogram mhis is the histogram shown in FIG. 10A, the frequency of the gradation value d is taken as the concentrated frequency p0. The concentrated frequencies p0 of the divided regions d[0][0] to d[5][9] is described as the concentrated frequencies p0[0][0] to p0[5][9]. For example, the concentrated frequency p0 of the divided region d[0][0] is described as the concentrated frequency p0[0][0], and the concentrated frequency p0 of the divided region d[5][9] is described as the concentrated frequency p0[5][9].

In the present embodiment, when Formula (4) below is satisfied, the frequency is determined to be concentrated. A constant gp is determined in advance, for example, by the manufacturer or user. The value of the constant gp may be changed by the user.

When ydata=0,mhis[Y][X][ydata]<mhis[Y][X][1]×2×gp. (1)

When ydata=255,mhis[Y][X][ydata]<mhis[Y][X][254]×2×gp. (2)

When ydata is other than 0,255,mhis[Y][X][ydata]< (mhis[Y][X][ydata−1]+mhis[Y][X][ydata+1]×gp. (3)

X: position of the divided region in the horizontal direction.

Y: position of the divided region in the vertical direction.

gp: constant. Formula (4)

The concentrated frequency addition unit 23 calculates the concentrated frequency (boundary peripheral region concentrated frequency d_p) of a boundary peripheral region in which an adjacent divided region and a peripheral divided region of the adjacent divided region are combined for each adjacent divided region from the concentrated frequency p0 and the adjacent divided region determination results j_b. The concentrated frequency addition unit 23 outputs the boundary peripheral region concentrated frequency d_p to the threshold determination unit 24.

In the present embodiment, the boundary peripheral region concentrated frequency d_p is determined also for divided regions other than the adjacent divided region. More specifically, the boundary peripheral region concentrated frequency d_p of the divided region other than the adjacent divided region is taken as 0. The boundary peripheral region concentrated frequencies d_p of the divided regions d[0][0] to d[5][9] are described as boundary peripheral region concentrated frequencies d_p[0][0] to d_p[5][9]. For example, the boundary peripheral region concentrated frequency d_p of the divided region d[0][0] is described as the boundary peripheral region concentrated frequency d_p[0][0].

In the present embodiment, the concentrated frequency addition unit 23 calculates the boundary peripheral region concentrated frequency d_p by adding up the concentrated frequency p0 of the adjacent divided region and the concentrated frequency p0 of the peripheral divided region. More specifically, the concentrated frequency addition unit 23 calculates the boundary peripheral region concentrated frequency d_p by Formula (5) below.

[Math. 2]

When $j\_b[Y][X]=1$ and a divided region with $mc=1$ is adjacent in the rightward direction, (1)

$$d\_p[Y][X] = \sum_{i=0}^{k} p0[Y][X+i].$$

When $j\_b[Y][X]=1$ and a divided region with $mc=1$ is adjacent in the leftward direction, (2)

$$d\_p[Y][X] = \sum_{i=0}^{k} p0[Y][X-i].$$

When $j\_b[Y][X]=1$ and a divided region with $mc=1$ is not adjacent in the horizontal direction, (3)

d_p[Y][X]=p0[Y][X].

When $j\_b[Y][X]=2$ and a divided region with $mc=1$ is adjacent in the downward direction, (4)

$$d\_p[Y][X] = \sum_{i=0}^{k} p0[Y+i][X].$$

When $j\_b[Y][X]=2$ and a divided region with $mc=1$ is adjacent in the upward direction, (5)

$$d\_p[Y][X] = \sum_{i=0}^{k} p0[Y-i][X].$$

When $j\_b[Y][X]=2$ and a divided region with $mc=1$ is not adjacent in the vertical direction, (6)

d_p[Y][X]=p0[Y][X].

When $j\_b[Y][X]=0$, (7)

d_p[Y][X]=0.

X: position of the divided region in the horizontal direction.

Y: positive of the divided region in the vertical direction.

k: number of divided regions with $mc=1$ that are continuous with respect to the adjacent divided region. Formula (5)

A specific example of a method for calculating the boundary peripheral region concentrated frequency d_p is described below. The method for calculating the boundary peripheral region concentrated frequency d_p involves the processing substantially identical to that of the method for calculating the boundary peripheral region monochrome frequency d_m of Embodiment 1. Therefore, the explanation thereof is conducted using FIG. 4.

In the divided region d[1][4], the adjacent divided region determination result j_b=1. The divided regions with mc=1 that are continuous in the horizontal direction with respect to the divided region d[1][4] are the divided regions d[1][5] to d[1][9]. Therefore, the region in which the divided regions d[1][4] to d[1][9] are combined is taken as a boundary peripheral region with respect to the divided region d[1][4]. The sum total of the concentrated frequencies p0[1][4] to p0[1][9] of the divided regions d[1][4] to d[1][9] is taken as a boundary peripheral region concentrated frequency d_p [1][4].

Further, in the divided region d[0][2], the adjacent divided region determination result j_b=2. There is no divided region with mc=1 which is continuous in the vertical direction with respect to the divided region d[0][2]. Therefore, the divided region d[0][2] is taken as a boundary peripheral region with respect to the divided region d[0][2]. The concentrated frequency p0[0][2] of the divided region d[0][2] is taken as a boundary peripheral region concentrated frequency d_p [0][2] of the divided region d[0][2].

The threshold determination unit 24 calculates for each divided region the threshold th_d from the adjacent divided region determination result j_b and the boundary peripheral region concentrated frequency d_p. The threshold determination unit 24 then outputs the threshold th_d to the monochrome/color re-determination unit 104.

In the present embodiment, the second threshold is calculated with respect to the adjacent divided region on the basis of the uniformity of pixel values (more specifically, brightness values) of the boundary peripheral region. More specifically, the threshold th_d is calculated such that the threshold th_d calculated when the uniformity is high becomes a threshold by which a divided region is more likely determined as a color region than by the threshold th_d calculated when the uniformity is low. In the pre sent embodiment, the larger is the threshold th_d, the more likely it is to determine that a divided region is a color region. Therefore, in the present embodiment, the threshold th_d calculated when the uniformity is high is made larger than the threshold th_d calculated when the uniformity is low.

A large boundary peripheral region concentrated frequency d_p means that the uniformity of pixel values is high. Accordingly, in the present embodiment, the threshold th_d is calculated on the basis of the boundary peripheral region concentrated frequency d_p so that the threshold th_d calculated when the d_p is large becomes a threshold by which a divided region is more likely determined as a color region than by the threshold th_d calculated when the d_p is small.

In the present embodiment, the threshold determination unit 24 calculates the threshold th_d by Formula (6) below. A constant g2 is determined in advance, for example, by the manufacturer or user. The value of the constant g2 may be equal to or different from that of the constant g1 in Embodiment 1. The value of the constant g2 may be changed by the user.

When $j\_b=1, th\_d = th + (d\_p/d\_all) \times (1-th) \times g2$.  (1)

When $j\_b=0, th\_d = th$.  (2)

d_all: total number of pixels in the boundary peripheral region.

g2: constant.    Formula (6)

Figure 10A:
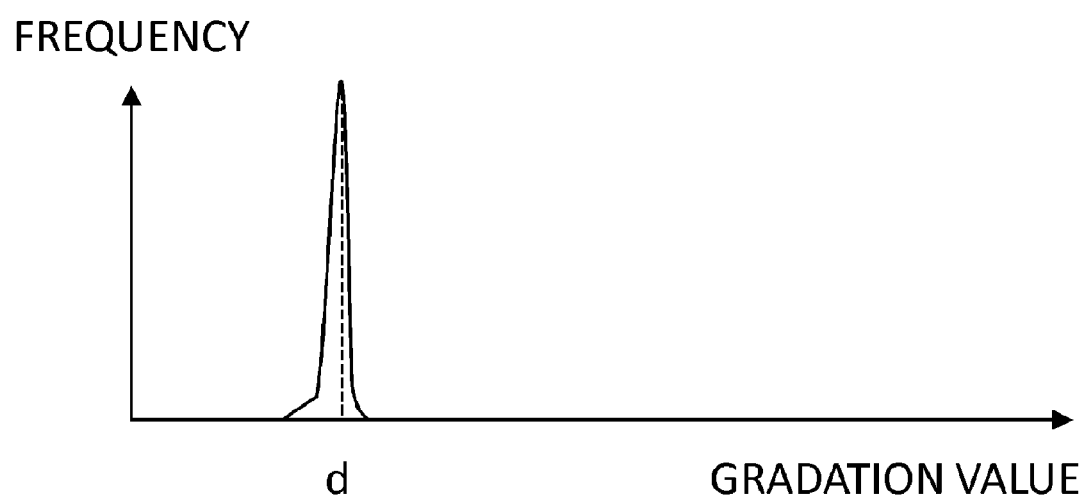
FIGS. 10A and 10B illustrate an example of a divided region and a histogram of pixel values of the divided region.
Figure 10B:
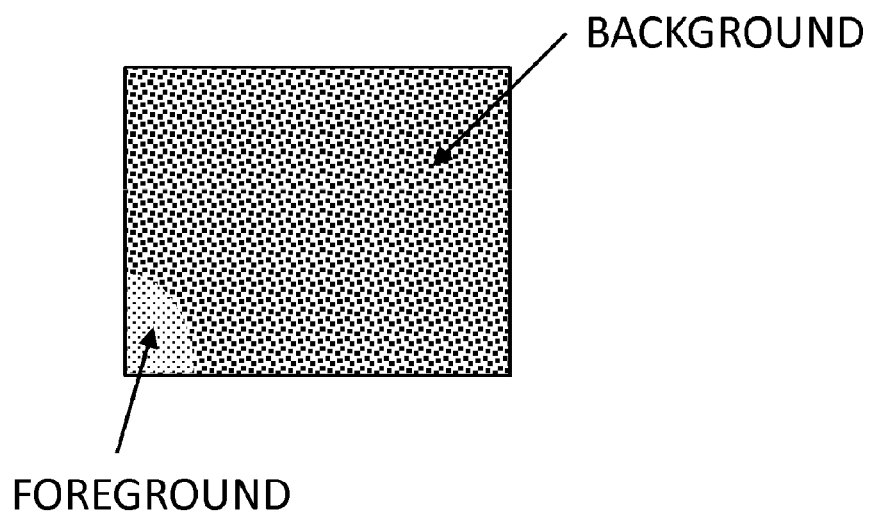

In color images such as medical images, the background pixel values are mostly uniform. Therefore, it is highly probable that the adjacent divided region with a high uniformity of pixel values is a divided region erroneously determined as a monochrome region although it is a color region. More specifically, it is highly probable that the image of the adjacent divided region with a high uniformity of pixel values such as shown in FIG. 10A is the image such as shown in FIG. 10B (the image that includes a very small foreground (color pixels) of a color image, with the remaining region being a background (monochrome pixels) of the color image). Meanwhile, it is highly probable that the image of the adjacent divided region with a low uniformity of pixel values is a monochrome region including a certain number of color pixels.

The abovementioned background pixels are often included not only into the divided region that has been erroneously determined as a monochrome region although it is a color region, but also into the peripheral divided regions thereof. Therefore, when the uniformity of pixel values in the boundary peripheral region is high, the probability of the adjacent divided region being the abovementioned erroneously determined divided region becomes even higher. Meanwhile, when the uniformity of pixel values in the boundary peripheral region is low, the probability of the adjacent divided region being a monochrome region including a certain number of color pixels becomes even higher.

In the present embodiment, as shown in Formula (6), the threshold th_d is made larger than the threshold th by an amount corresponding to the degree of the abovementioned uniformity. By performing the re-determination by using such a threshold th_d, it is possible to determine with better accuracy as to whether the adjacent divided region is a color region or a monochrome region. More specifically, the adjacent divided region which is highly probable to be a color region can be re-determined as a color region, and an adjacent divided region which is highly probable to be a monochrome region including a certain number of color pixels can be re-determined as a monochrome region.

The effect obtained in the present embodiment will be explained below on the basis of a specific example.

Figure 11A:
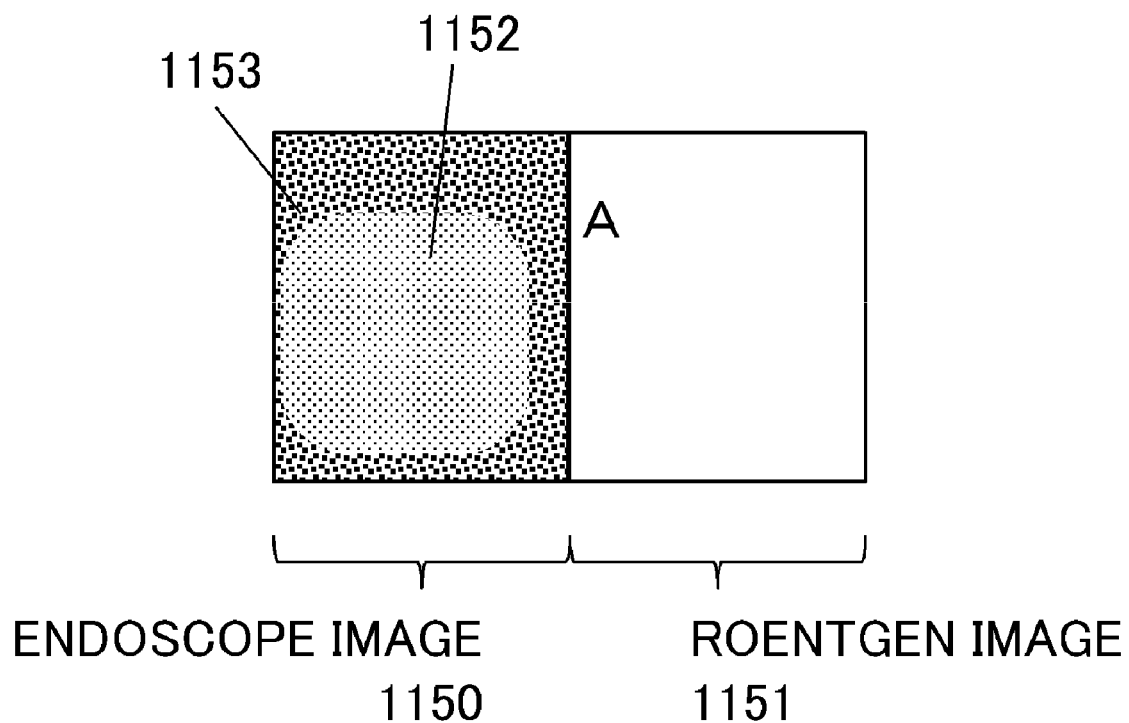
FIGS. 11A and 11B illustrate an example of the effect obtained in Embodiment 2.

FIG. 11A illustrates an example of an input image. In the example shown in FIG. 11A, in the input image, an endoscope image 1150 is arranged on the left side and a Roentgen image 1151 is arranged on the right side. The endoscope image 1150 is constituted by a foreground 1152 and a background 1153. The Roentgen image 1151 includes color annotation "A".

Figure 11B:
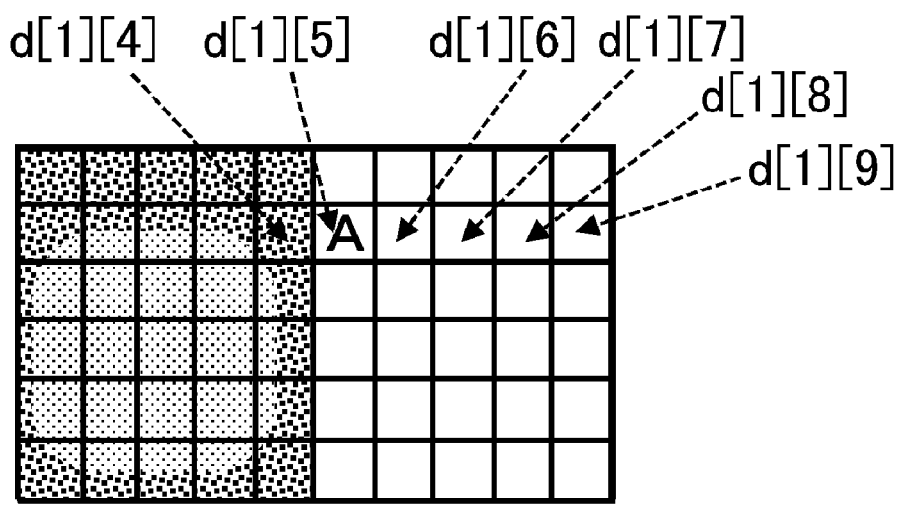
Figure 12A:
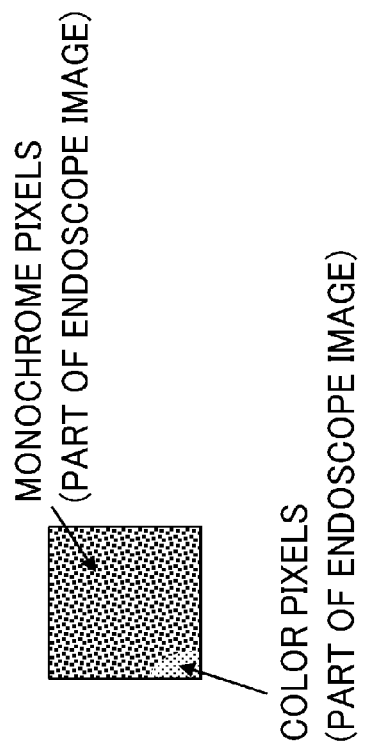
FIGS. 12A to 12D illustrate the problems inherent to the related art.
Figure 12B:
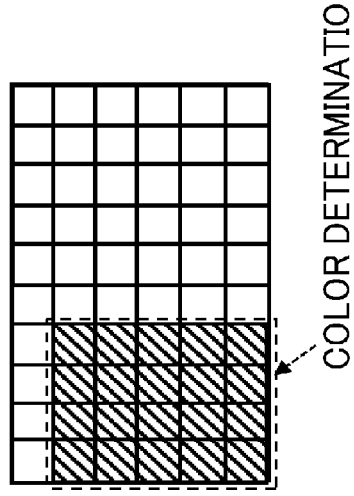
Figure 12C:
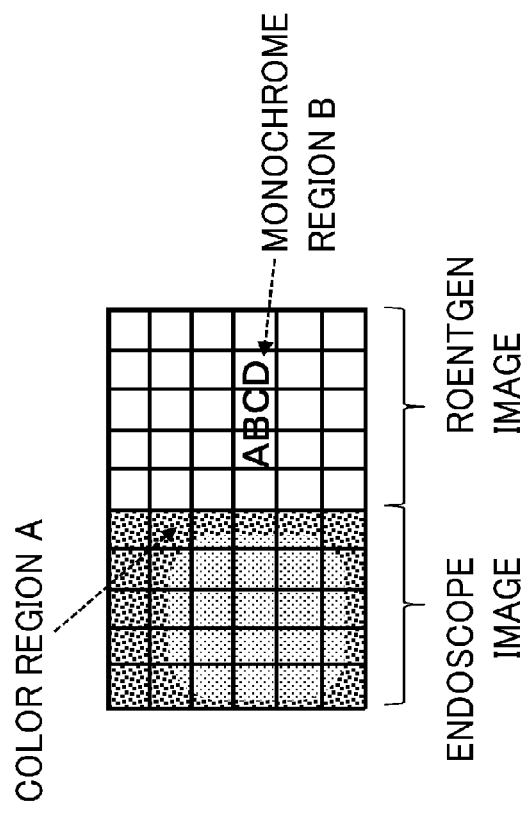
Figure 12D:
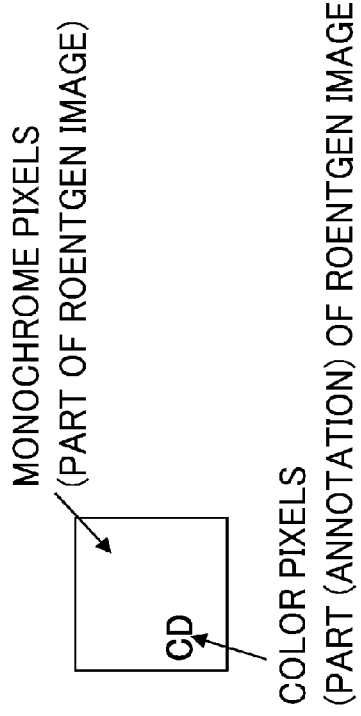

In this case, where the threshold th is used to determine whether a divided region is a color region or a monochrome image for each divided region shown in FIG. 11B, the divided region d[1][4] including the foreground 1152 of the endoscope image 1150 is correctly determined as a color region. The divided region d[1][5] adjacent to the divided region d[1][4] is correctly determined as a monochrome region.

In this case, the divided region d[1][5] is taken as an adjacent divided region and where the re-determination is performed by the method similar to that of Embodiment 1, this region is erroneously determined as a color region.

Meanwhile, in the present embodiment, the divided region d[1][5] can be correctly determined as a monochrome region. More specifically, in the divided region d[1][5] (and the divided regions d[1][6] to d[1][9] continuous to the divided region d[1][5]), the uniformity of pixel values is low. Therefore, in the present embodiment, the threshold th_d of the divided region d[1][5] is taken to as a value substantially equal to the threshold th. As a result, the divided region d[1][5] can be correctly re-determined as a monochrome region.

As mentioned hereinabove, in the present embodiment, the second threshold is calculated on the basis of the uniformity of pixel values in the boundary peripheral region. As a result, a divided region that has been erroneously determined as a monochrome region, although it is a color region, can be correctly re-determined as a color region, and the occurrence of a tradeoff, such that where either of a monochrome region and a color region is determined correctly, the other is determined erroneously, can be inhibited. For example, when the adjacent divided region is a divided region including a certain number of color pixels and the peripheral divided region thereof is a divided region including no color pixels, the adjacent divided region can be re-determined correctly as a monochrome region.

Further, in the present embodiment, the configuration is used in which the second threshold is calculated on the basis of the uniformity of pixel values in a region obtained by combining the adjacent divided region and the peripheral divided region, but such a configuration is not limiting. As mentioned hereinabove, an adjacent divided region with a high uniformity of pixel values is highly probable to be a divided region erroneously determined as a monochrome region although it is a color region. Meanwhile, an adjacent divided region with a low uniformity of pixel values is highly probable to be a monochrome region including a certain number of color pixels. Therefore, the second threshold may be also calculated on the basis of uniformity of pixel values only of the adjacent divided region.

Further, in the present embodiment, the uniformity of brightness values of monochrome pixels is used as the uniformity of pixel values, but uniformity of pixel values is not limited to such selection. For example, uniformity of pixel values of color pixels and uniformity of pixel values of all of the pixels (all of the pixels in the divided region) including monochrome pixels and color pixels may be also used. The uniformity of pixel values may also be the uniformity of color difference signals (Cb value and Cr value).

Embodiment 3

An image processing apparatus and a control method therefor according to Embodiment 3 will be explained below.

In the image processing apparatus according to the present embodiment, an input image is divided into a color region and a monochrome region, and image processing is performed individually for the color region and monochrome region. In the present embodiment, the γ correction stipulated by digital imaging and communication in medicine (DICOM) Part 14 (DICOM γ correction) is applied with respect to the monochrome region, and the γ correction with γ=2.2 (2.2γ correction) is applied with respect to the color image.

Figure 13:
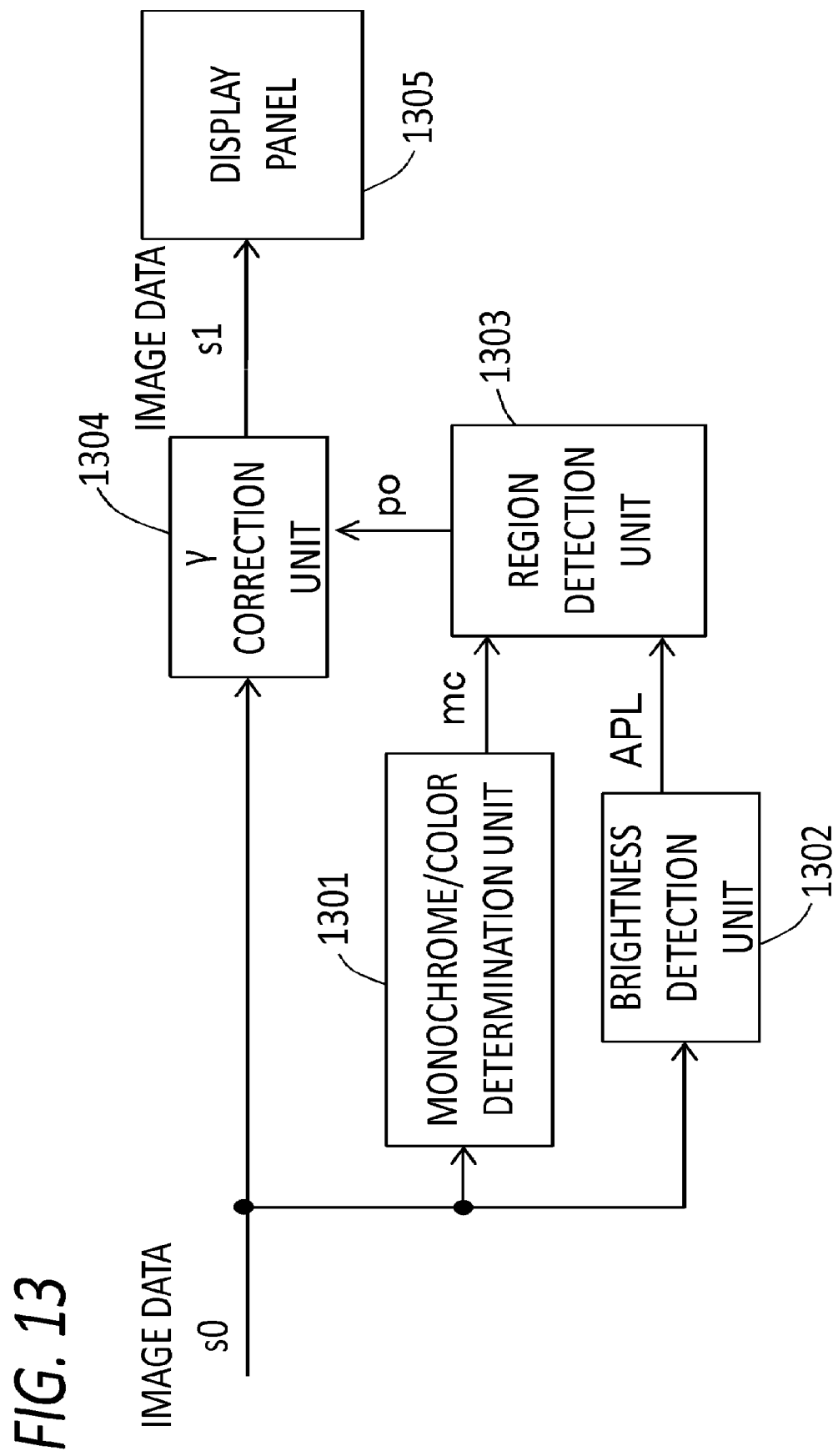
FIG. 13 is a block diagram illustrating an example of the functional configuration of the image processing apparatus according to Embodiments 3 and 4.

FIG. 13 is a block diagram illustrating an example of the functional configuration of the image processing apparatus according to the present embodiment. The image processing apparatus according to the present embodiment has a monochrome/color determination unit 1301, a brightness detection unit 1302, a region detection unit 1303, a γ correction unit 1304, and a display panel 1305. In the image processing apparatus according to the present embodiment, image data s0 (input image) are inputted from a personal computer (not shown in the figure). Further, the image processing apparatus according to the present embodiment generates image data s1 by performing γ correction with respect to the image data s0 and displays the image based on the image data s1 on the display panel 1305. In the present embodiment, image data s0, s1 are assumed to be RGB data.

In the present embodiment, an example is explained in which the display panel 1305 is part of the image processing apparatus, but the display panel 1305 may be an apparatus separate from the image processing apparatus.

Further, the image data are not necessarily the RGB data. For example, the image data may be YCbCr data.

The monochrome/color determination unit 1301 generates and outputs a monochrome determination signal mc for each divided region (rectangular block) obtained by dividing the input image (image data s0). The monochrome determination signal mc indicates whether the corresponding divided region is a monochrome region or a color region.

Figure 14:
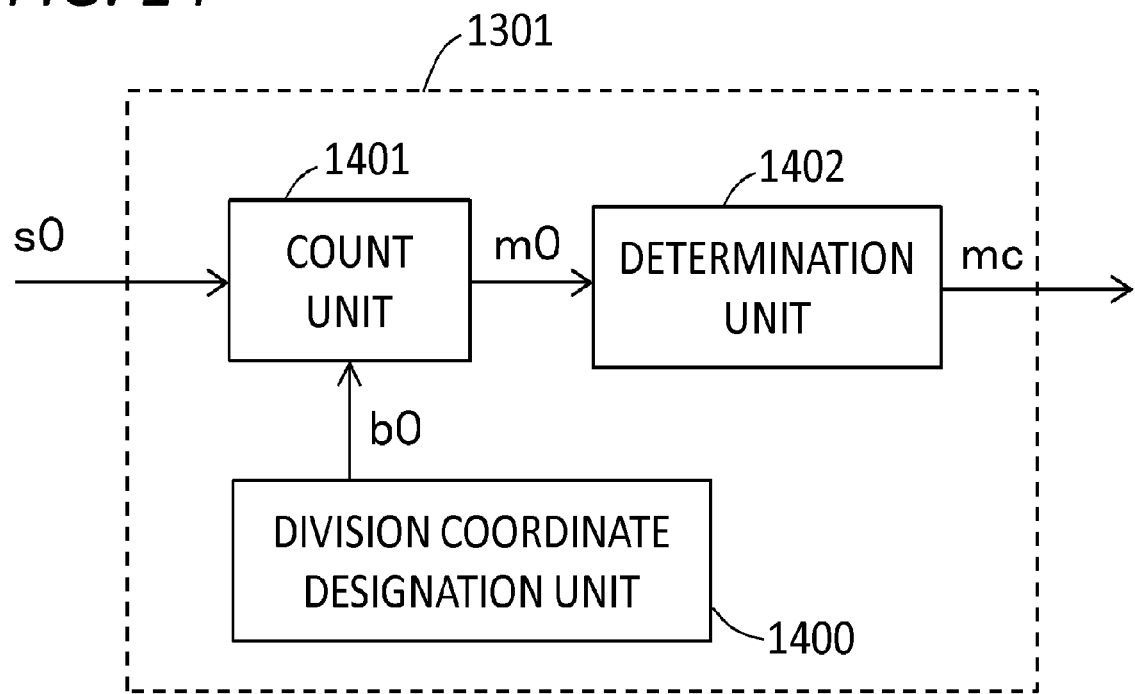
FIG. 14 is a block diagram illustrating in detail an example of the monochrome/color determination unit according to Embodiments 3 to 5.

FIG. 14 is a block diagram illustrating in detail the monochrome/color determination unit 1301. The monochrome/color determination unit 1301 is constituted by a division coordinate designation unit 1400, a count unit 1401, and a determination unit 1402.

Figure 15A:
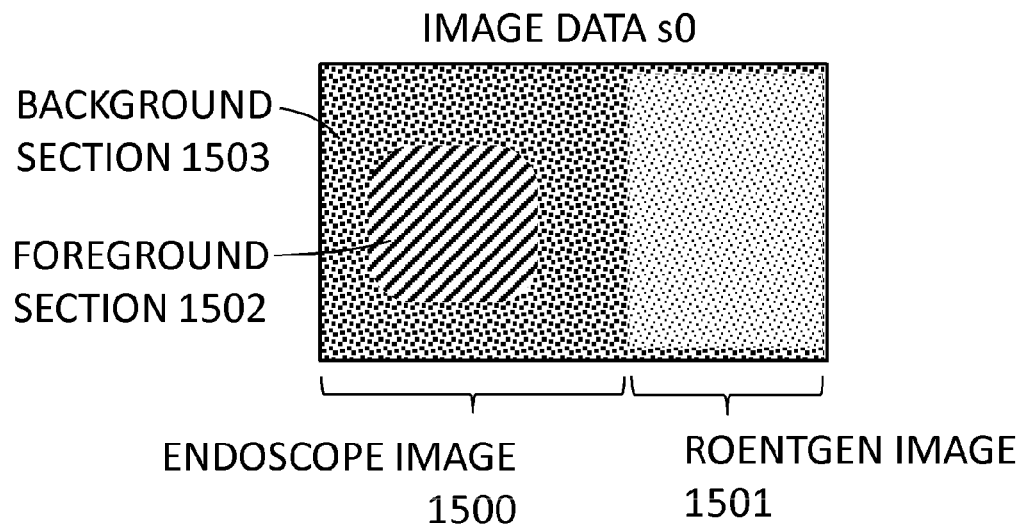
FIGS. 15A to 15C illustrate an example of a processing flow of the monochrome/color determination unit according to Embodiments 3 and 5.
Figure 15B:
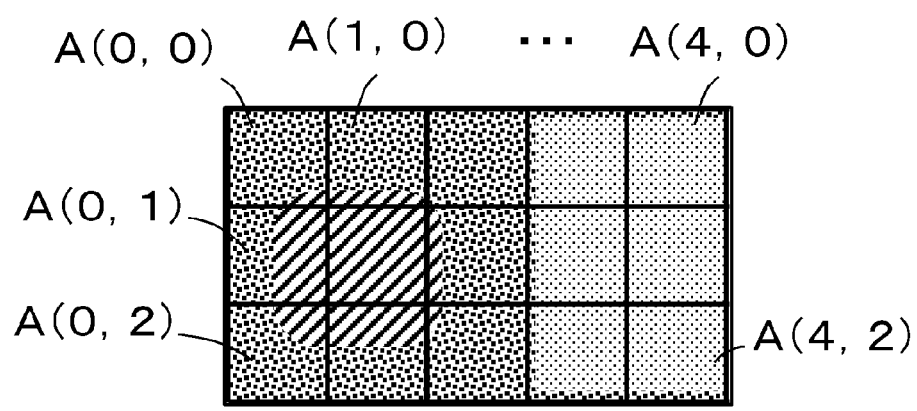
Figure 15C:
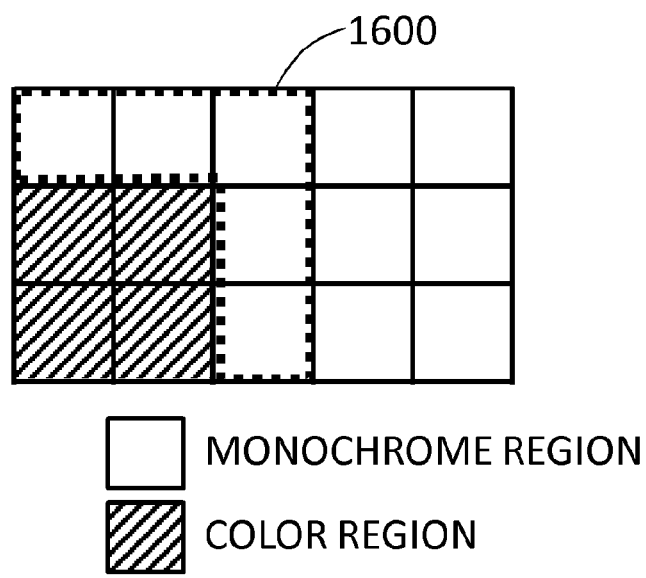

FIGS. 15A to 15C illustrate the processing flow in the monochrome/color determination unit 1301.

The processing performed in the monochrome/color determination unit 1301 is explained below with reference to FIGS. 14 and 15A to 15C.

FIG. 15A illustrates an example of image data s0. In the example shown in FIG. 15A, the image data s0 are data on the image in which an endoscope image 1500 is arranged on the left side and a Roentgen image 1501 is arranged on the right side. The Roentgen image 1501 is a monochrome image (image constituted by pixels with R value=G value=B value). Further, the endoscope image 1500 is constituted by a foreground section 1502 which is a region of the image picked up by the endoscope and a background section 1503 which includes other regions. The pixels of the foreground section 1502 are all color pixels, and the pixels of the background section 1503 are pixels with a low brightness value (in the present embodiment, R value=G value=B value=0). In the present embodiment, the image size of the image data s0 is 1920 pixels in the horizontal direction by 1200 pixels in the vertical direction.

The division coordinate designation unit 1400 determines a plurality of divided regions and outputs coordinate information representing each divided region (division coordinate information b0) to the count unit 1401. In the present embodiment, the plurality of divided regions is assumed to include 15 region obtained by dividing the image data s0 into five regions in the horizontal direction and three regions in the vertical direction. The number of the divided regions is not limited to 15. Thus, the number of the divided regions may be greater or less than 15, for example, 10 or 20.

FIG. 15B illustrates an example of 15 divided regions A(0, 0) to A(4, 2) determined by the division coordinate designation unit 1400. In the present embodiment, the size of the divided region is 384 in the horizontal direction (=1920 divided by 5) by 400 pixels in the vertical direction (=1200 divided by 3).

The count unit 1401 acquires the statistical value of pixel values for each divided region. More specifically, the count unit 1401 counts the number (referred to hereinbelow as "monochrome frequency") of the monochrome pixels in a divided region for each divided region determined by the division coordinate designation unit 1400 and outputs monochrome frequency data m0 representing the monochrome frequency of each divided region. In the present embodiment, the count unit 1401 determines a pixel in which an R value, a G value, and a B value are all the same as a monochrome pixel and counts the monochrome frequency. However, this method for determining whether a pixel is a monochrome pixel is not limiting. For example, it is also possible to convert RGB data into brightness data (Y) and color difference data (Cb, Cr) and determine a pixel with a color difference (Cb, Cr) equal to zero as a monochrome pixel. The monochrome frequency data m0 are data representing one monochrome frequency for each divided region. Therefore, in the present embodiment, the monochrome frequency data m0 are data representing 15 monochrome frequencies with respect to the image data s0 of one frame.

Further, in the present embodiment, the statistical value is taken as the monochrome frequency, but the statistical value is not limited thereto. For example, the statistical value may be pixel values of all of the pixels including monochrome pixels and color pixels, the number of color pixels, or a histogram (8 bit: −128 to 127) for each color difference value (Cb, Cr). Essentially, any statistical value may be used, provided that this value makes it possible to determine whether the divided region is a monochrome region or a color region.

The statistical value may be also acquired from the outside.

The determination unit 1402 determines whether the divided region is a monochrome region or a color region for each divided region from the monochrome frequency data m0. Then, the determination unit 1402 outputs a monochrome determination signal mc_representing the determination result for each divided region. The monochrome determination signal mc is data representing one determination result for each divided region. Therefore, in the present embodiment, the monochrome determination signals mc are data representing 15 determination results with respect to the image data s0 of one frame.

In the present embodiment, the determination unit 1402 determines a divided region for which the ratio of the monochrome frequency to the total number of pixels in the divided region is equal to or greater than 95% as a monochrome region and determines a divided region with this ratio less than 95% as a color region. In this case, the threshold is set to 95%, rather than 100%, in order to determine that the divided region is a monochrome region even if a certain number of color pixels is present therein, with consideration for color annotation in the monochrome image.

In the present embodiment, the size of a divided region is 384 pixels in the horizontal direction by 400 pixels in the vertical direction. Therefore, the divided region with a monochrome frequency equal to or greater than 145920 (=384× 400×0.95) is determined as a monochrome region and a divided region with the monochrome frequency less than 145920 is determined as a color region.

FIG. 15C illustrates an example of determination results obtained in the determination unit 1402. The divided regions shown by white color in the figure are the divided regions determined as monochrome regions, and the divided regions shown by oblique hatching are the divided regions determined as color regions. In the five divided regions 1600 surrounded by a broken line in FIG. 15C, color pixels are present in parts of the divided regions, but the divided regions are determined as monochrome regions. This is because, as mentioned hereinabove, the threshold is set to 95% so that a divided region be determined as a monochrome region even if a certain number of color pixels are present therein.

When the DICOM γ correction is applied to the monochrome regions and the 2.2γ correction is applied to the color regions in response only to the monochrome determination signal mc, the DICOM γ correction is also applied to the color pixels (pixels of the foreground section 1502) included in the five divided regions 1600. Meanwhile, the 2.2γ correction is applied to the four divided regions determined as color regions. As a result, a display brightness step occurs in the foreground section 1502 and image quality is degraded (an obstacle is created from the standpoint of image quality). More specifically, a step in display brightness appears at the boundary of the region determined as a monochrome region and a region determined as a color region.

Accordingly, in the present embodiment, where a region with a low brightness (referred to hereinbelow as "low-brightness region") is present in the vicinity of the boundary between the color region and monochrome region, the boundary is moved so that it passes inside the low-brightness region. In the low-brightness region, the difference between the display brightness observed when the DICOM γ correction is applied and the display brightness observed when the 2.2γ correction is applied is small. Therefore, by moving the boundary into the low-brightness region, it is possible to reduce the degradation of quality caused by the abovementioned erroneous determination (image quality obstacle can be reduced). In particular, in color images that are medical diagnostic images, the background is most often black. Since the difference in the display brightness becomes particularly low in the black region, when the color image is a medical diagnostic image, the present invention makes it possible to reduce significantly the degradation of image quality.

The brightness detection unit 1302 calculates an average brightness value of a small divided region for each of the small divided regions obtained by dividing the image data s0 to a degree smaller than that of the divided regions. The average brightness value is used in the below-described region detection unit 1303 to detect a low-brightness region.

Figure 16:
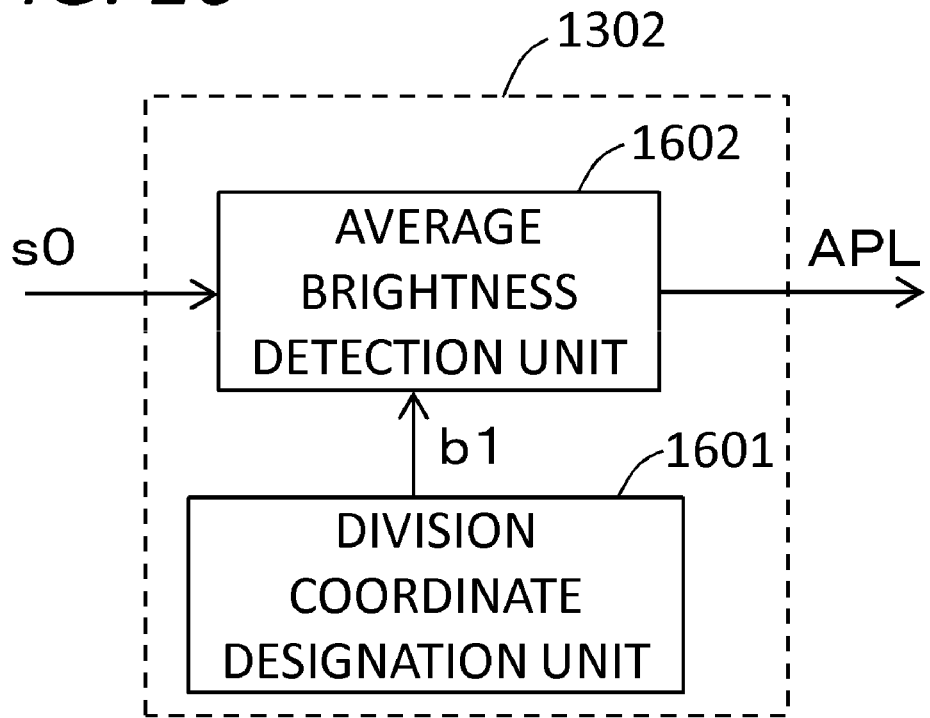
FIG. 16 is a block diagram illustrating in detail an example of the brightness detection unit according to Embodiments 3 and 4.

FIG. 16 is a block diagram illustrating in detail the brightness detection unit 1302. The brightness detection unit 1302 is constituted by a division coordinate designation unit 1601 and an average brightness detection unit 1602.

The processing performed by the brightness detection unit 1302 will be described below with reference to FIG. 16.

The division coordinate designation unit 1601 determines a plurality of small divided regions and outputs coordinate information (division coordinate information b1) representing the small divided regions to the average brightness detection unit 1602. In the present embodiment, the plurality of small divided regions is 60 regions obtained by dividing the image data s0 in 10 regions in the horizontal direction and 6 regions in the vertical direction. Thus, in the present embodiment, the small divided region is obtained by dividing a divided region into 4 regions constituting 2 rows and 2 columns. The number of the small divided regions may be greater or less than 60, for example, 40 or 80.

Figure 17:
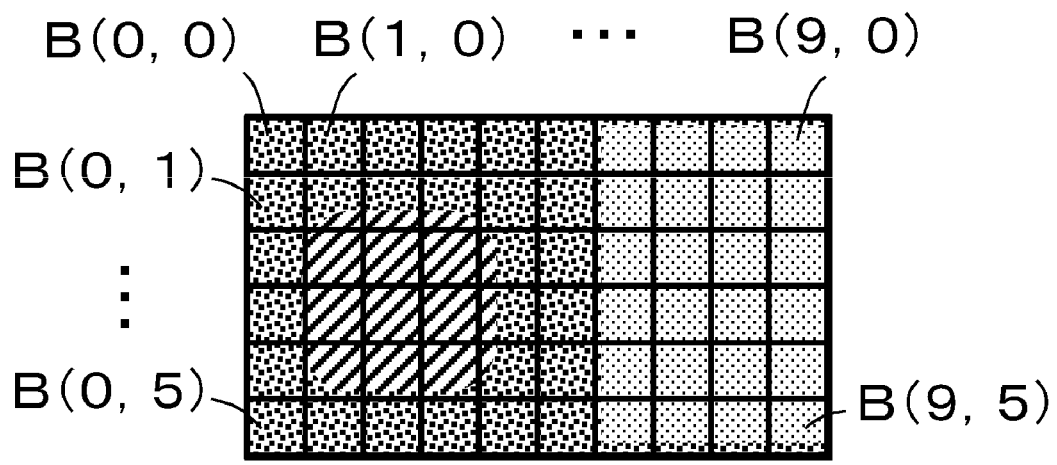
FIG. 17 illustrates an example of a small divided region according to Embodiment 3.

FIG. 17 shows an example of 60 small divided regions B(0, 0) to B(9,5) determined by the division coordinate designation unit 1601. In the present embodiment, the size of the small divided region is 192 (=1920 divided by 10) pixels in the horizontal direction by 200 (=1200 divided by 6) pixels in the vertical direction. Thus, the size of the small divided region in the horizontal direction and vertical direction is half that of the divided region.

The average brightness detection unit 1602 detects (calculates) an average brightness value of a small divided region for each small divided region and outputs average brightness data APL representing the average brightness value of each small divided region. In the present embodiment, an average pixel value is calculated from the R value, G value, and B value of a pixel by using Formula (7) for each pixel in the small divided region. The average value of the average pixel values for each pixel in the small divided region is taken as the average brightness value of the small divided region.

$$\text{Average pixel value} = (R \text{ value} + G \text{ value} + B \text{ value})/3 \quad \text{Formula (7)}$$

The average brightness data APL represent a single average brightness value for each small divided region. Therefore, in the present example, the average brightness data APL represent 60 average brightness values with respect to the image data s0 of one frame.

Further, in the present embodiment, the image data s0 (R value, G value, B value) are 8-bit (0 to 255) data, and the average brightness values are also assumed to be represented within a range of 0 to 255. Further, in the present embodiment, the brightness detection unit 1302 is assumed to detect average brightness values, but such a configuration is not limiting. Thus, any information that makes it possible to determine whether a region is a low-brightness region, such as brightness histogram, may be obtained.

The region detection unit 1303 divides the input image into a color region and a monochrome region. More specifically, the region detection unit 1303 determines a color region on the basis of the monochrome determination signal mc and average brightness data APL, and outputs coordinate information po representing the color region to they correction unit 1304. In the present embodiment, the coordinate information po is assumed to include an upper left coordinate (x, y) which is a start point of the color region and a lower right coordinate (x, y) which is the end point. In the present embodiment, the upper left coordinate of the image data s0 is the point of origin (0, 0), and the lower right coordinate is (1919, 1199).

The coordinate information po is not limited to the information including the upper left coordinate (x, y) and lower right coordinate (x, y). For example, the coordinate information po may be information including the upper left coordinate (x, y) and the size of the color region in the horizontal direction and vertical direction.

Figure 18:
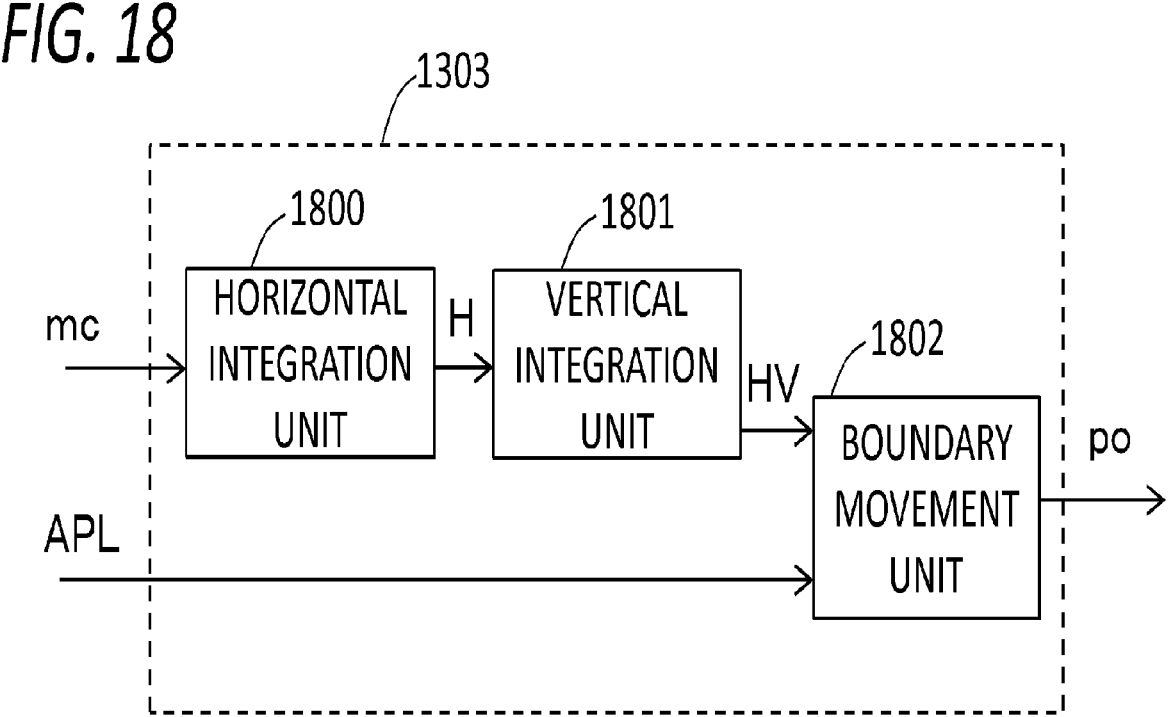
FIG. 18 is a block diagram illustrating in detail an example of the region detection unit according to Embodiments 3 and 4.

FIG. 18 is a block diagram illustrating in detail the region detection unit 1303. The region detection unit 1303 is constituted by a horizontal integration unit 1800, a vertical integration unit 1801, and a boundary movement unit 1802.

The horizontal integration unit 1800 produces a single color region by integrating a plurality of color regions (a plurality of divided regions determined as color regions) continuous in the horizontal direction. The horizontal integration unit 1800 outputs coordinate information H(L) representing the horizontal coordinates (x coordinates) of the left end and right end of the integrated color region (L is a row number).

The vertical integration unit 1801 produces a single color region by integrating a plurality of color regions (a plurality of divided regions obtained by integration in the horizontal integration unit 1800) continuous in the vertical direction. The vertical integration unit 1801 outputs coordinate information HV representing the upper left coordinate and lower right coordinate of the integrated color region.

Further, in the present embodiment, a region other than the color region is assumed to be a monochrome region.

As a result of the integration performed by the horizontal integration unit 1800 and the vertical integration unit 1801, the input image region is divided into color regions and monochrome regions in the divided region units.

However, the present invention is not limited to the feature of dividing the input image region into color regions and monochrome regions in the divided region units. In other words, it is not necessary for the boundary between the divided regions determined by the division coordinate designation unit 1400 to match the boundary of the color regions and monochrome regions. Any method can be used in the present invention, provided that the input image is divided into a color region and a monochrome region. For example, when a threshold such that a divided region is determined as a monochrome region even if a certain number of color pixels is present therein is used as a threshold for determining whether the divided region is a color region or a monochrome region, it is highly probable that pixels of the edge section of a color image be included in the divided region determined as a monochrome region. Therefore, the input image may be divided into a color region and a monochrome region so that the boundary is positioned inside the monochrome divided region (divided region that is determined as a monochrome region) adjacent to the color divided region (divided region determined as a color region).

Figure 19A:
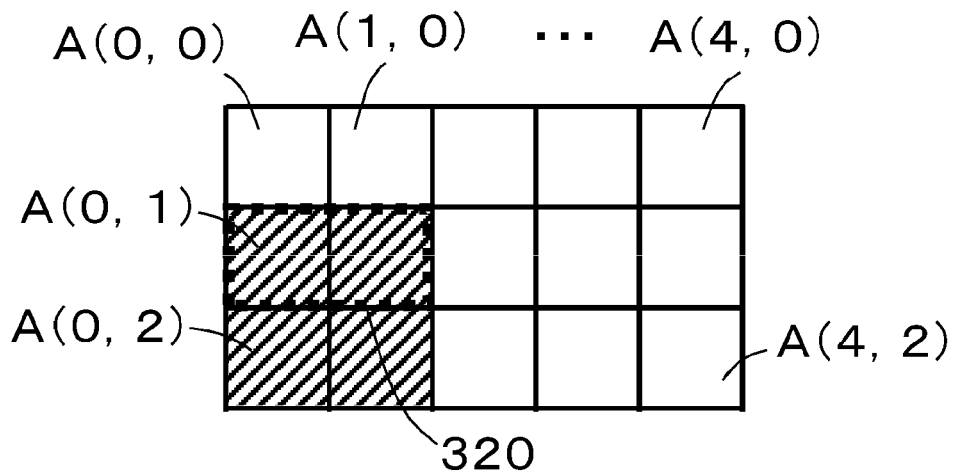
FIGS. 19A to 19C illustrate examples of processing flows performed in the horizontal integration unit and vertical integration unit according to Embodiments 3 and 5.
Figure 19B:
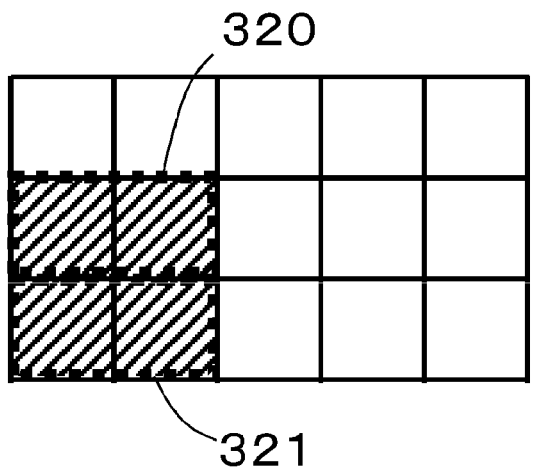
Figure 19C:
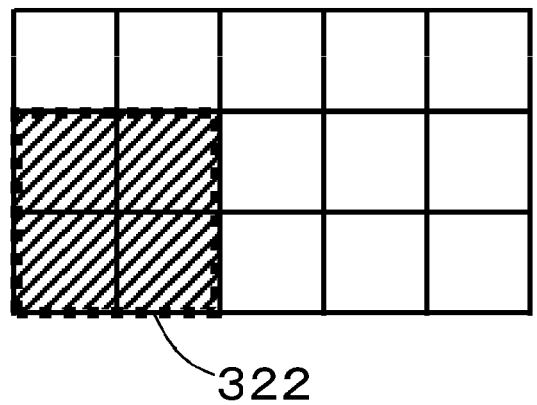

FIGS. 19A to 19C illustrate a processing flow of the horizontal integration unit 1800 and the vertical integration unit 1801. The divided regions shown by white color in FIGS. 19A to 19C are monochrome regions, and the divided regions shown by oblique hatching are col or regions.

The processing performed by the horizontal integration unit 1800 is explained below.

First, the horizontal integration unit 1800 scans the divided regions A(0, 0) to A(4, 0) of the first (leftmost) row from left to right and integrates continuous color regions, provided that such are present. In the example shown in FIG. 19A, no color regions are present among the divided regions A(0, 0) to A(4,0) and, therefore, no integration is performed. In the present embodiment, when no color region is present, the coordinate information H(1) has the following value.

$$H(1) = (x \text{ coordinate of the left end}, x \text{ coordinate of the right end}) = (-1,-1). \quad \text{Formula (8)}$$

Then, the horizontal integration unit 1800 scans the divided regions A(0, 1) to A(4, 1) of the second row. In the example shown in FIG. 19A, the divided regions A(0, 1) and A(1, 1) are color regions. Therefore, the horizontal integration unit 1800 integrates those two divided regions A(0, 1) and A(1, 1) to obtain a single color region. A region 320 shown by a dot line in FIG. 19A is a color region obtained by integrating the divided regions A(0, 1) and A (1, 1). The coordinate information H(2) of the integrated color region 320 is as follows.

$$H(2) = (0,767). \quad \text{Formula (9)}$$

In this case, the x coordinate of the right end in Formula (9), which is equal to 767, is obtained by subtracting 1 from 384×2=768, which is the size of the two divided regions in the horizontal direction.

The horizontal integration unit 1800 then performs similar processing also with respect to the divided regions A(0, 2) to A(4, 2) of the third row. In the example shown in FIG. 19A, the divided regions A(0, 2) and A(1, 2) are color regions. Therefore, the horizontal integration unit 1800 integrates those two divided regions A(0, 2) and A(1, 2) to obtain a single color region. A region 321 shown by a dot line in FIG. 19B is a color region obtained by integrating the divided regions A(0, 2) and A(1, 2). The coordinate information H(3) of the integrated color region 321 is as follows.

$$H(3) = (0,767). \quad \text{Formula (10)}$$

The processing performed in the vertical integration unit 1801 is explained below.

The vertical integration unit 1801 integrates the color regions continuous in the vertical direction by using the coordinate information H(1) to H(3) of three types outputted from the horizontal integration unit 1800.

From H(1), it can be determined that no color regions are present in the first row. From H(2) and H(3), it can be determined that the horizontal positions and horizontal sizes of the color regions in the second and third rows are the same (H(2)=H(3)). The vertical integration unit 1801 integrates a plurality of color regions that thus have the same horizontal positions and horizontal sizes and are continuous in the vertical direction into a single color region. As a result of the integration performed by the vertical integration unit 1801, as shown in by a dot line in FIG. 19C, the four divided regions A(0, 1), A(1, 1), A(0, 2), and A(1, 2) are integrated into a single color region 322. The vertical integration unit 1801 outputs the coordinate information HV representing the upper left coordinate and lower right coordinate of the integrated color region 322. In the case illustrated by FIG. 19C, the coordinate information HV is as follows.

$$HV=((\text{upper left coordinate}),(\text{lower right coordinate}))=((0,400),(767,1199)). \quad \text{Formula (11)}$$

The boundary movement unit 1802 moves the boundary of the color region and monochrome region divided by the horizontal integration unit 1800 and the vertical integration unit 1801 so that the boundary passes inside a boundary proximity region when the brightness value in the boundary proximity region is lower than a predetermined value. The boundary proximity region is a region separated by a predetermined distance into the monochrome region from the boundary of the monochrome region and the color region that are divided by the horizontal integration unit 1800 and the vertical integration unit 1801.

Figure 20A:
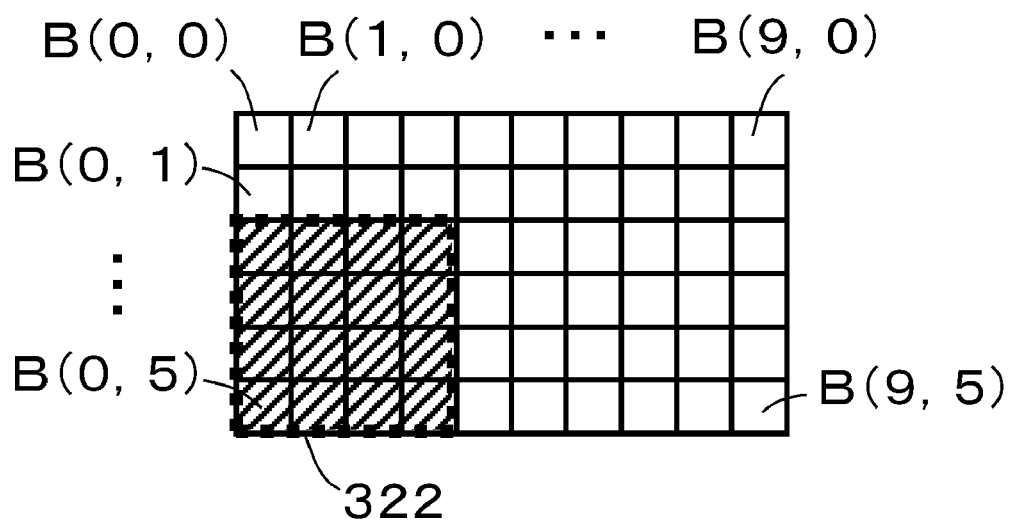
FIGS. 20A and 20B illustrate an example of a processing flow performed in the boundary movement unit according to Embodiment 3.
Figure 20B:
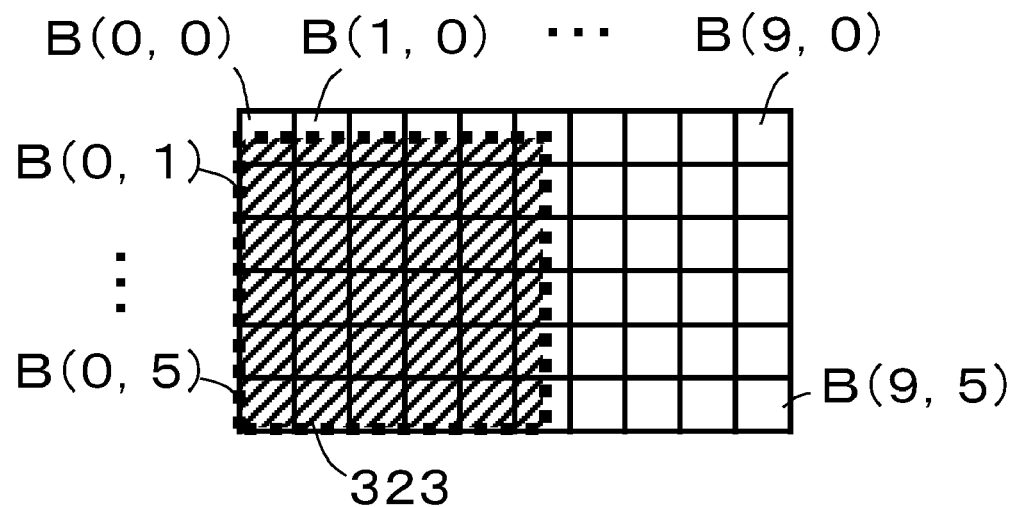

FIGS. 20A and 20B illustrate the processing flow performed in the boundary movement unit 1802. In FIG. 20A, small divided regions B(0, 0) to B(9, 5) are superimposed on the color region integrated by the vertical integration unit 1801. The region (region that is obliquely hatched) 322 surrounded by the dot line in FIG. 20A is a color region integrated by the vertical integration unit 1801.

In the present embodiment, the boundary movement unit 1802 determines whether or not the regions separated by a predetermined number of pixels from the color region 322 in the four directions (up, down, left, right) are low-brightness regions (regions with a brightness lower than a predetermined value). When a low-brightness region is present, the boundary movement unit 1802 moves the boundary in this direction.

In the present embodiment, the above-mentioned predetermined number of pixels is taken as the number of pixels in one small divided region (192 pixels in the case of the horizontal direction, and 200 pixels in the case of the vertical direction). Therefore, in the present embodiment, a small divided region that is not adjacent to the boundary, from among the four small divided regions in the divided region adjacent to the boundary, is taken as a boundary proximity region. The average value L of the average brightness values of the small divided regions which are the boundary proximity regions in the four directions (up, down, left, right) is calculated for each of the directions. Where the calculated average value L is less than a predetermined threshold th2, this boundary proximity region is determined as a low-brightness region. In the present embodiment, the predetermined threshold th2 is assumed to be 3. However, the threshold th2 is not limited to this value. The value of the threshold th2 is set and changed, as appropriate, according to the object, for example, as to which lightness of the region ensures that this region is a low-brightness region.

In the example shown in FIG. 20A, no image is present in the direction leftward and the direction downward of the color region 322. Therefore no boundary proximity region is set with respect to those two directions.

Meanwhile, concerning the direction upward of the color region 322, four small divided regions B(0, 0) to B(3, 0) located at positions separated by one small divided region in the direction upward of the upper end of the color region 322 are taken as boundary proximity regions. As shown in FIG. 17, since the small divided regions B(0, 0) to B(3, 0) include only the pixels of the background 1503, the average brightness values of the small divided regions B(0, 0) to B(3, 0) are all 0. Therefore, the average value L of the average brightness values of the small divided regions B(0, 0) to B(3, 0) is zero. Since the average value L(=0) is less than the threshold th2 (=3), the boundary proximity region in the direction upward of the color region 322 is determined as a low-brightness region.

The reason why a small divided region separated by a predetermined distance (one small divided region) from a color region is taken as a boundary proximity region in the present embodiment is explained below. It is possible that the average brightness value of the small divided regions (in the example shown in FIG. 20A, small divided regions B(0, 1) to B(3, 1)) adjacent to the color region includes pixel values of color pixels (in the present embodiment, the foreground section 1502 shown in FIG. 15A). Therefore, even if a low-brightness region is present in the small divided regions adjacent to the color region, the average value L of such small divided regions is not necessarily equal to or less than the threshold th2. Accordingly, in the present embodiment, a small divided region separated by the predetermined distance from the color region is taken as the boundary proximity region.

Likewise, concerning the direction rightward of the color region 322, four small divided regions B(5, 2) to B(5, 5) located at positions separated by one small divided region in the direction rightward of the right end of the color region 322 are taken as boundary proximity regions. As shown in FIG. 17, since the small divided regions B(5, 2) to B(5, 5) include only the pixels of the background 1503, the average value L of the average brightness values of the small divided regions B(5, 2) to B(5, 5) is zero. Since this average value L is less than the threshold th2, the boundary proximity region in the direction rightward of the color region 322 is determined as a low-brightness region.

Further, since the boundary proximity regions in the direction upward of and to the right from the color region 322 are low-brightness regions, the boundary movement unit 1802 moves the upper boundary and right boundary of the color region 322 upward and rightward, respectively. In the present embodiment, the movement distance of the boundary is 300 pixels in either of the horizontal direction and vertical direction. However, this movement distance is not limiting and may be any value, provided that the boundary passes inside the low-brightness region. Further, in the present embodiment, the length of the four boundaries on the upper, lower, left, and right sides of the color region 322 is adjusted so that the color region is a rectangular region.

Where the boundary is moved, the region (obliquely hatched region) 323 surrounded by a dot line in FIG. 20B becomes a final color region. As a result, the input image is divided into the color region and monochrome region so as to include the entire foreground section (region constituted by color pixels) of the color image.

The boundary movement unit 1802 outputs the coordinate information po indicating the upper left coordinate and lower right coordinate of the color region 323. The coordinate information po of the color region 323 is as follows.

$$po=(\text{upper left coordinate, lower right coordinate})((0, 100),(1067,1199)). \quad \text{Formula (12)}$$

In Formula (12), the x coordinate value=1067 of the lower right coordinate is obtained by adding 300 to the horizontal size (384×2) of two divided regions and subtracting 1 from the sum obtained.

The γ correction unit 1304 performs the individual γ correction with respect to the color regions and monochrome regions on the basis of the coordinate information po. Since the regions designated by the coordinate information po are color regions, the 2.2γ correction is used. Other regions are determined as monochrome regions, and the DICOM γ correction is used.

As mentioned hereinabove, in the present embodiment, when the boundary proximity region is a low-brightness region, the boundary of the monochrome region and color region is moved so that this boundary passes inside the low-brightness region. Since the difference in brightness caused by the difference in image processing methods is small in the low-brightness region, the degradation of image quality (brightness step) caused by erroneous determination of the color region as a monochrome region can be reduced. In particular, in medical diagnostic images, the background is most often black. Since the difference in brightness caused by the difference in image processing methods is especially small in the black region, the present invention is particularly effective when the color image is a medical diagnostic image.

In the present embodiment, the average value L of the average brightness values of a plurality of small divided regions is compared with the threshold th2 to determine whether or not the plurality of small divided regions is low-brightness regions, but such a configuration is not limiting. For example, it is also possible to compare the average brightness value of one small divided region, from among the plurality of small divided regions, with the threshold th2 and determine whether or not the plurality of small divided regions is low-brightness regions. It is also possible to compare the average brightness value of a small divided region with the threshold th2 for each small divided region which is a boundary proximity region and determine whether or not the small divided regions are low-brightness regions.

Further, in the present embodiment, a configuration is used in which a color region is detected by integrating the divided regions determined as color regions in the horizontal integration unit 1800 and the vertical integration unit 1801, and other regions are taken as monochrome regions, but such a configuration is not limiting. For example, it is also possible to detect a monochrome region by integrating the divided regions determined as monochrome regions in the horizontal integration unit 1800 and the vertical integration unit 1801 and take other regions as color regions. In another possible configuration, a color region is detected by integrating the divided regions determined as color regions and detecting a monochrome region by integrating the divided regions determined as monochrome regions.

In the present embodiment, an example is explained in which the image processing performed individually with respect to color regions and monochrome regions is the γ correction, but this image processing is not limiting. Thus, the image processing may be lightness adjustment processing or color temperature adjustment processing.

Further, in the present embodiment, an example is explained in which the boundary proximity region is a region in a divided region adjacent to the boundary, but such a configuration of the boundary proximity region is not limiting. Thus, the boundary proximity region may be set further on the monochrome region side with respect to the divided region adjacent to the monochrome region side of the boundary. For example, a small divided region separated by two small divided regions from the boundary on the monochrome region side may be taken as the boundary proximity region. The boundary proximity region may be any region that is separated by a predetermined distance on the monochrome region side from a boundary of the color region and monochrome region divided by the horizontal integration unit 1800 and the vertical integration unit 1801, and the predetermined distance may have any value. However, from the standpoint of detecting the background of a color region as a low-brightness region, it is preferred that the boundary proximity region be a region within a divided region adjacent to the boundary.

Further, in the present embodiment, an example is explained in which a small divided region is obtained by dividing a divided region into four regions in 2 rows and 2 columns, but such a small divided region is not limiting. The small divided region may be a region obtained by even smaller division of the input image into divided regions. For example, the size of a small divided region is not necessarily an integer fraction of the size of a divided region.

In the present embodiment, an example is explained in which the color image and monochrome image are medical images, but such color image and monochrome image are not limiting. For example, the color image may be an image of an application for displaying an image, an icon, a graphic, or the like.

Embodiment 4

An image processing apparatus and a control method therefor according to Embodiment 4 of the present invention will be explained below. The difference between this embodiment and Embodiment 3 is explained below in greater detail, and the explanation of functions or features similar to those of Embodiment 3 is herein omitted.

Figure 21A:
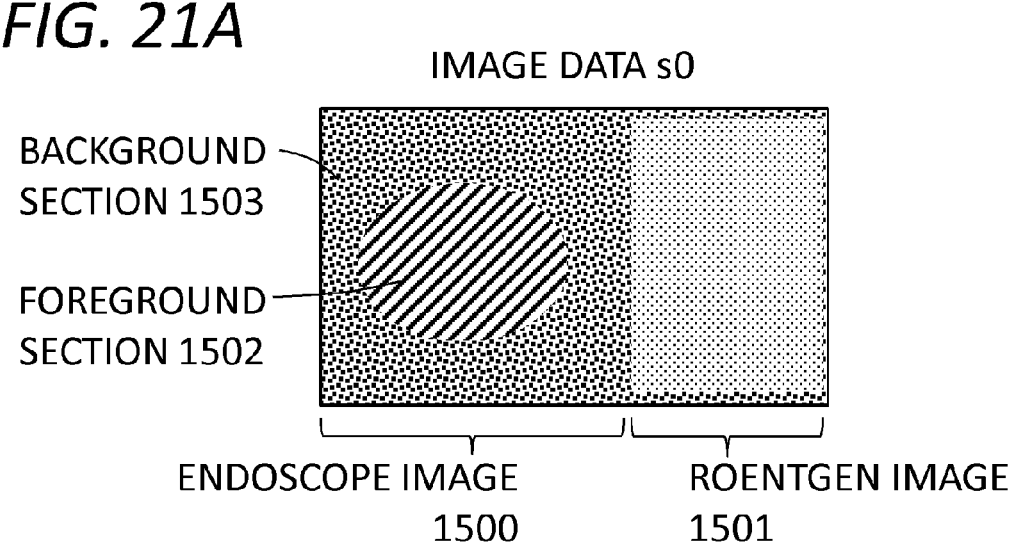
FIGS. 21A to 21C illustrate an example of a processing flow performed in the monochrome/color determination unit according to Embodiment 4.

In Embodiment 4, an example of image data s0 is explained that is different from that in Embodiment 3. The image data s0 of the present embodiment are shown in FIG. 21A. In the image data s0 of the present embodiment, the shape of a foreground 1502 of an endoscope image 1500 is different from that in Embodiment 3. In aspects other than the shape of the foreground 1502, the image data s0 are same as those in Embodiment 3 (FIG. 15A).

Figure 21B:
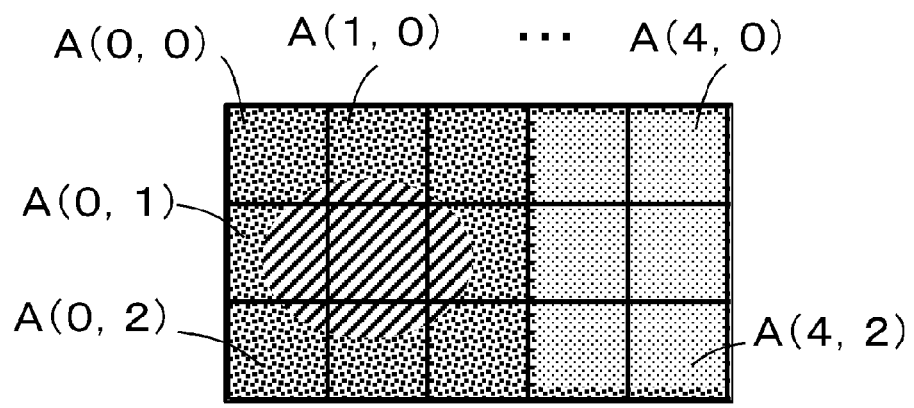

FIG. 21B illustrates divided regions. In the present embodiment, 15 divided regions are set in the same manner as in Embodiment 3.

Figure 21C:
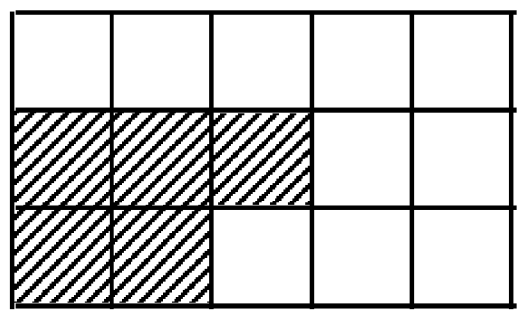

FIG. 21C illustrates the determination results (results of determining whether a divided region is a monochrome region or a color region for each divided region) obtained by a determination unit 1402.

Figure 22:
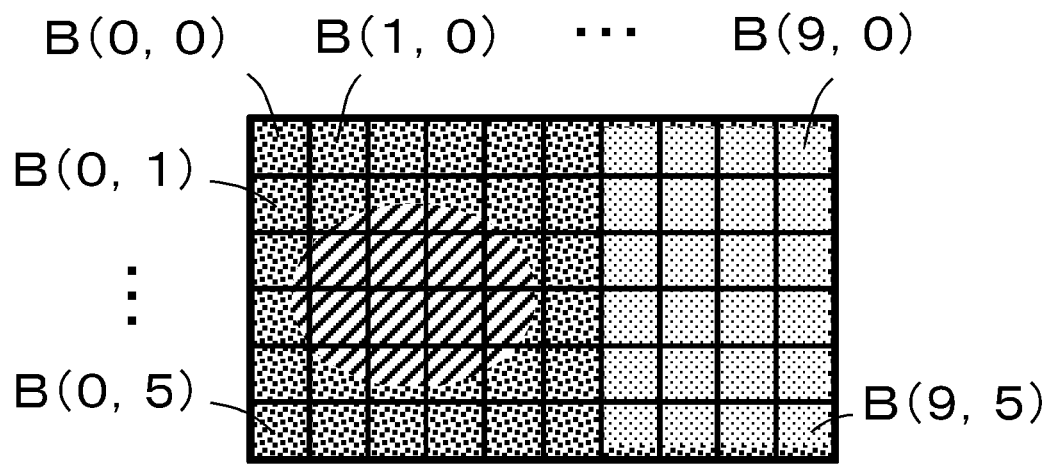
FIG. 22 illustrates an example of the small divided region according to Embodiment 4.

FIG. 22 illustrates small divided regions. In the present embodiment, 60 small divided regions are set in the same manner as in Embodiment 3.

Figure 23:
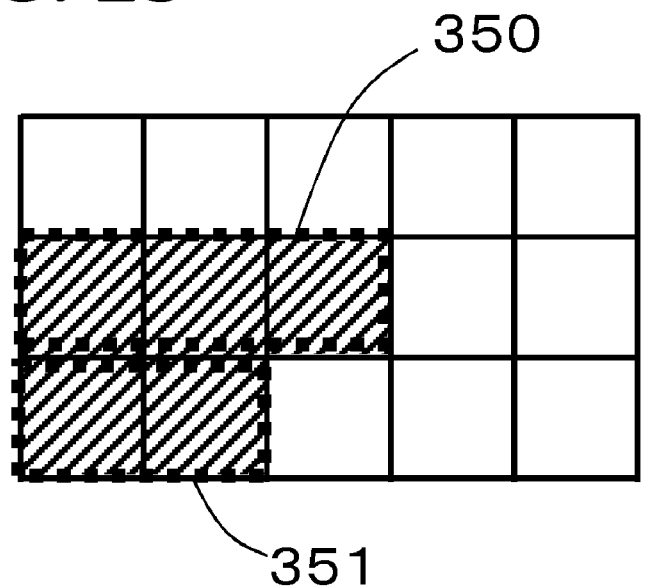
FIG. 23 illustrates an example of processing results obtained in the horizontal integration unit according to Embodiment 4.

FIG. 23 shows a color region integrated by a horizontal integration unit 1800. In the present embodiment, the coordinate information H of a color region 350 integrated by the horizontal integration unit 1800 is as follows.

$$H(2)=(0,1151). \quad \text{Formula (13)}$$

The x coordinate=1151 of the right end in Formula (13) is obtained by subtracting 1 from the horizontal size=384×3=1152 of three divided regions.

The coordinate information H of a color region 351 is as follows.

$$H(3)=(0,767). \quad \text{Formula (14)}$$

In the present embodiment, the coordinate information H of the color region 350 does not match that of the color region 351. Therefore, those two color regions are not integrated by the vertical integration unit 1801. As a result, the coordinate information HV, which is the output of the vertical integration unit 1801, represents the upper left coordinate and lower right coordinate of two color regions as shown hereinbelow.

$$HV1=((0,400),(1151,799)).  \quad\text{Formula (15)}$$

$$HV2=((0,800),(767,1199)).  \quad\text{Formula (16)}$$

Thus, in the present embodiment, a plurality of color regions is set and, therefore, a plurality of boundaries of color regions and monochrome region is present. In the present embodiment, in such a case, a boundary movement unit 1802 performs the processing of moving the boundary for each boundary. More specifically, in the example shown in FIG. 23, the processing of moving the boundary of the color region 350 and the monochrome region and the processing of moving the boundary of the color region 351 and the monochrome region are performed. The same procedure is used in the case where a plurality of monochrome regions is set in the configuration in which the monochrome regions are detected to move the boundary.

The processing of moving the boundary of the color region 350 and the monochrome region is explained below.

In the direction upward of the color region 350, a total of six small divided regions B(0, 0) to B(5, 0) shown in FIG. 22 are taken as boundary proximity regions. Since the small divided regions B(0, 0) to B(5, 0) include only the pixels of the background 1503, the average value L is zero. Since the average value L is less than the threshold th2 (=3), the boundary proximity region in the direction upward of the color region 350 is determined as a low-brightness region. As a result, the boundary above the color region 350 is moved upward through 300 pixels.

Likewise, concerning the direction downward of the color region 350, six small divided regions B(0, 5) to B(5, 5) shown in FIG. 22 are taken as boundary proximity regions. Since the small divided regions B(0, 5) to B(5, 5) include only the pixels of the background 1503, the average value L is zero. Since the average value L is less than the threshold th2, the boundary proximity region in the direction downward of the color region 350 is determined as a low-brightness region. As a result, the boundary below the color region 350 is moved downward through 300 pixels.

Concerning the direction rightward of the color region 350, two small divided regions B(7, 2) and B(7, 3) shown in FIG. 22 are taken as boundary proximity regions. However, since the small divided regions B(7, 2) and B(7, 3) include only the pixels of a Roentgen image 1501, as shown in FIG. 22, the average value L is equal to or greater than the threshold th2, and it is determined that the boundary proximity region in the direction rightward of the color region 350 is not a low-brightness region. Therefore, the boundary movement unit 1802 does not move the boundary on the right side of the color region 350.

Further, since no image is present in the direction leftward of the color image 350, the boundary movement unit 1802 does not set a boundary proximity region in the leftward direction and does not move the boundary on the left side of the color region 350.

Figure 24A:
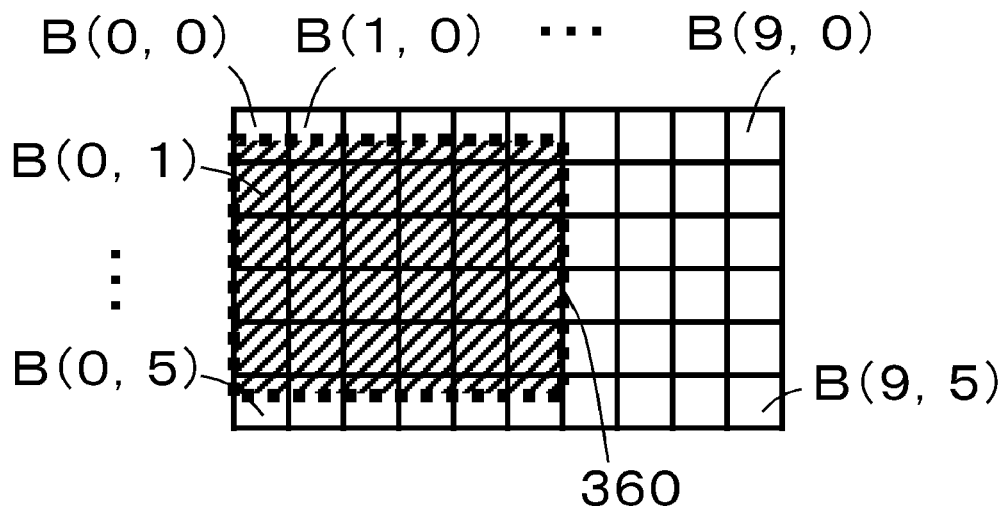
FIGS. 24A and 24B illustrate an example of a processing flow performed in the boundary movement unit according to Embodiment 4.

FIG. 24A illustrates how the boundary of the color region 350 is moved by the boundary movement unit 1802. As shown in FIG. 24A, the boundaries on the upper side and lower side of the color region 350 are moved by the boundary movement unit 1802 in the upward and downward directions, respectively, and the color region 350 finally becomes a color region 360.

Figure 24B:
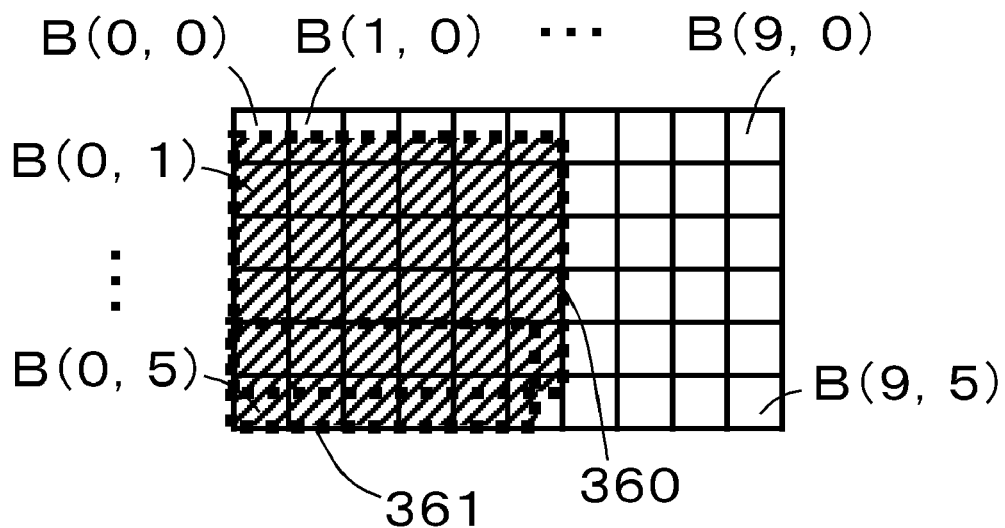

The boundary movement unit 1802 performs similar processing of moving a boundary also with respect to the color region 351. As a result, the boundary of the right side of the color region 351 is moved in the rightward direction through 300 pixels. As a consequence, the color region 351 becomes a color region 361 as shown in FIG. 24B. The examination as to whether or not a low-brightness region is present (by setting a boundary proximity region, comparing the average value L with a threshold, or the like) may or may not be performed with respect to the boundary on the upper side of the color region 351 (boundary of the color region 350 and color region 351).

The region detection unit 1303 outputs the coordinate information po representing the two color regions 360, 361. The γ correction unit 1304 applies the 2.2γ correction to the regions represented by the coordinate information po. With respect to a region in which the color region 360 and the color region 361 overlap, they correction is performed such that the 2.2γ correction is applied only once (so that the 2.2γ correction is not applied twice).

As described hereinabove, in accordance with the present embodiment, the processing of moving the boundaries is performed when a plurality of boundaries is present. Therefore, the degradation of image quality (step in brightness) can be reduced better than when only one boundary is moved.

Embodiment 5

An image processing apparatus and a control method therefor according to Embodiment 5 of the present invention will be explained below.

In Embodiments 3 and 4, the feature of setting a plurality of small divided regions and selecting a boundary proximity region from among a plurality of small divided regions is used. In the present embodiment, the feature of setting a boundary proximity region, without setting the small divided regions, is explained. The difference between this embodiment and Embodiment 3 is explained below, and the explanation of functions or features similar to those of Embodiment 3 is herein omitted.

Figure 25:
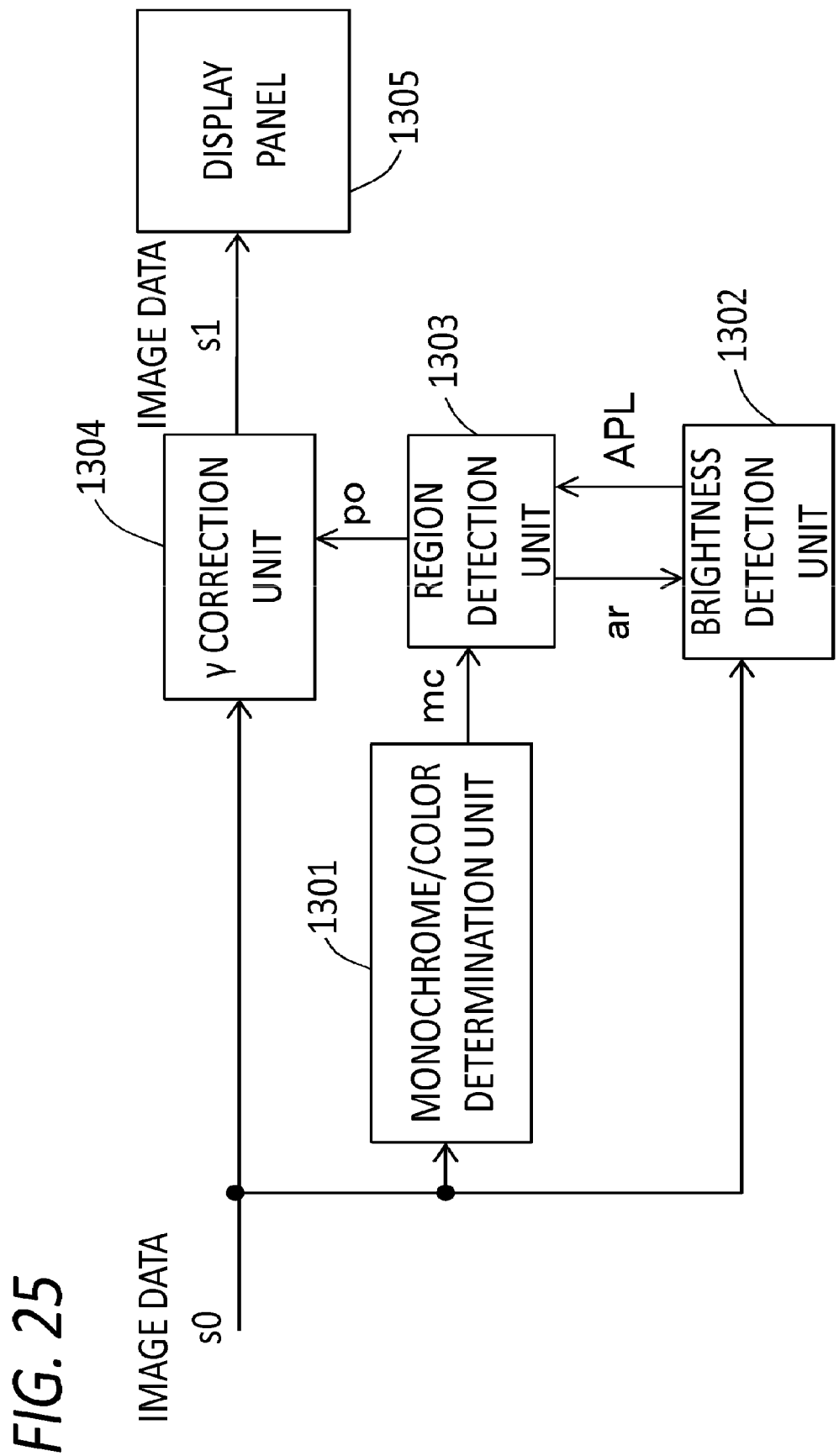
FIG. 25 is a block diagram illustrating an example of the functional configuration of the image processing apparatus according to Embodiment 5.

FIG. 25 is a block diagram illustrating an example of the functional configuration of the image processing apparatus according to the present embodiment. In the present embodiment, similarly to Embodiments 3 and 4, the image processing apparatus is constituted by a monochrome/color determination unit 1301, a brightness detection unit 1302, a region detection unit 1303, a γ correction unit 1304, and a display panel 1305.

In the present embodiment, an example of processing the image data s0 shown in FIG. 15A is explained.

The monochrome/color determination unit 1301 has functions similar to those described in Embodiment 3. Therefore, the determination results obtained by the monochrome/color determination unit 1301 with respect to the image data s0 shown in FIG. 15A are those shown in FIG. 15C.

Figure 26:
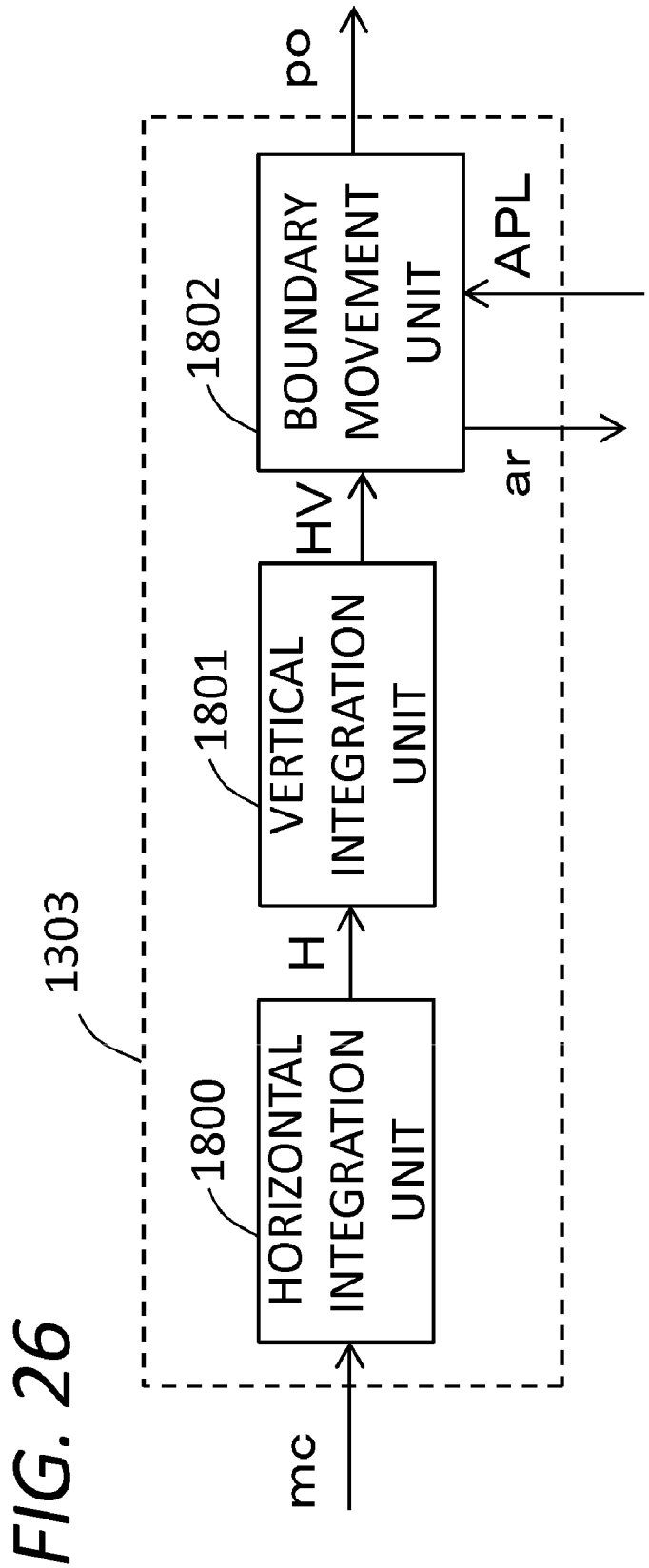
FIG. 26 is a block diagram illustrating in detail an example of the region detection unit according to Embodiment 5.

FIG. 26 is a block diagram illustrating in detail the region detection unit 1303. In the present embodiment, similarly to Embodiment 3, the region detection unit 1303 is constituted by a horizontal integration unit 1800, a vertical combination unit 1801, and a boundary movement unit 1802.

The functions of the horizontal integration unit 1800 and the vertical integration unit 1801 are similar to those described in Embodiment 3.

The boundary movement unit 1802 of the present embodiment determines a boundary proximity region and then outputs coordinate information ar representing the boundary proximity region to the brightness detection unit 1302. The boundary movement unit 1802 then receives average brightness data APL representing the average brightness value of the boundary proximity region from the brightness detection unit 1302. When the average brightness value is less than a predetermined threshold th2, the boundary movement unit 1802 determines that the boundary proximity region is a low-brightness region and moves the boundary so that the boundary passes inside the boundary proximity region.

Figure 27:
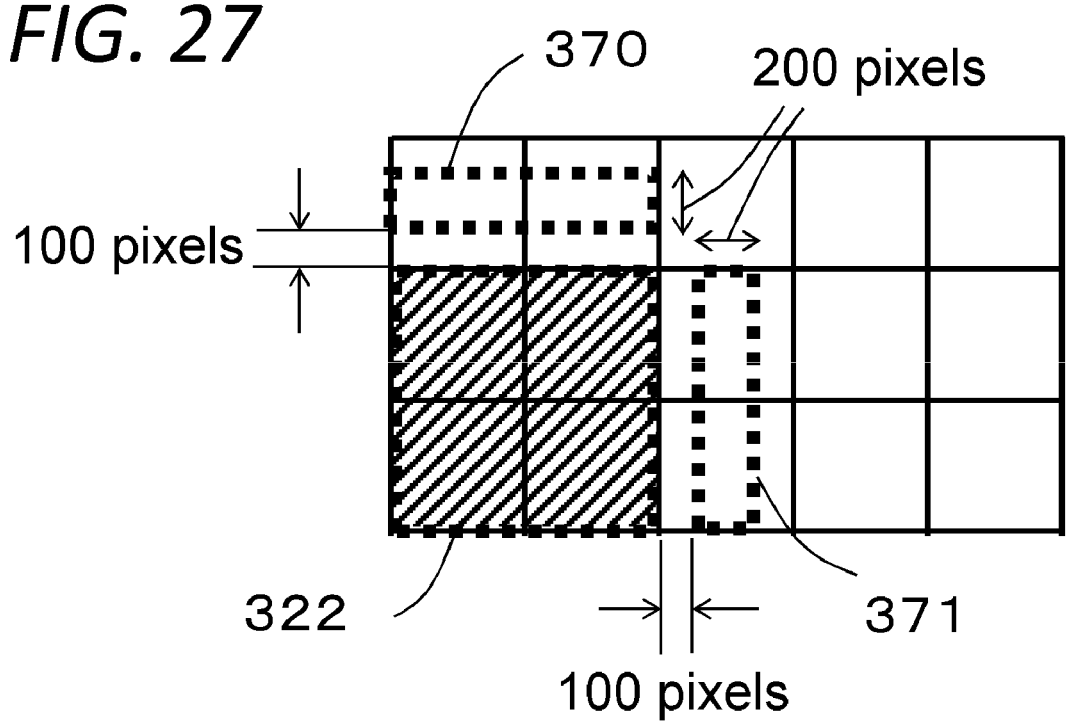
FIG. 27 illustrates an example of boundary proximity region determination processing performed in the boundary movement unit according to Embodiment 5.

FIG. 27 illustrates the processing performed by the boundary movement unit 1802 to determine the boundary proximity region (boundary proximity region determination processing).

The boundary movement unit 1802 inputs coordinate information HV on the color regions from the vertical integration unit 1801. The boundary movement unit 1802 determines a region separated by a predetermined number of pixels as a boundary proximity region in each of the four directions (up, down, left, right) with respect to the color region represented by the coordinate information HV. In the present embodiment, it is assumed with respect to one direction that a region which is at a distance of 100 pixels from the color region 322 and has a width of 200 pixels in this direction is a boundary proximity region.

More specifically, in the case of image data s0 shown in FIG. 15A, two regions 370, 371 are taken as boundary proximity regions, as shown in FIG. 27. The region 370 is at a distance of 100 pixels from the upper end of the color region 322 and is constituted by 768 pixels in the horizontal direction by 200 pixels in the vertical direction. The region 371 is at a distance of 100 pixels from the right end of the color region 322 and is constituted by 200 pixels in the horizontal direction by 800 pixels in the vertical direction. Since no images are present in the leftward and downward directions of the color region 322, no boundary proximity regions are set. In this case, the coordinate information ar represents the regions 370, 371 in the following manner.

$ar1=$(upper left coordinate of region 370,lower right coordinate of region 370)=((0,101),(767,300)).    Formula (17)

$ar2=$(upper left coordinate of region 371,lower right coordinate of region 371)=((467,400),(666,800)).    Formula (18)

Figure 28:
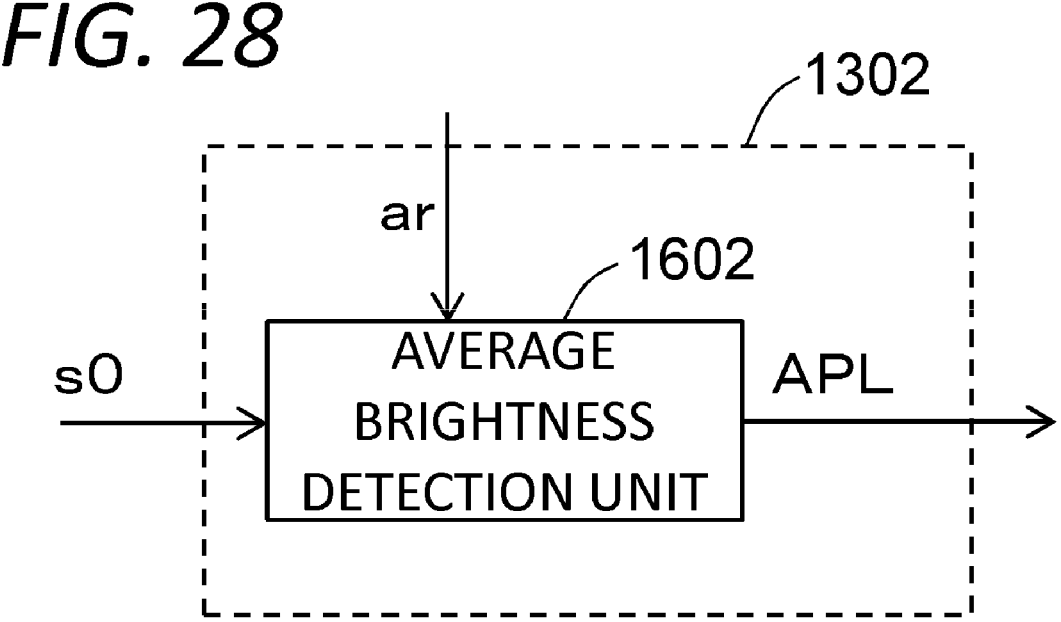
FIG. 28 is a block diagram illustrating a detailed example of the brightness detection unit according to Embodiment 5.

FIG. 28 is a block diagram illustrating in detail the brightness detection unit 1302 of the present embodiment.

The brightness detection unit 1302 of the present embodiment is constituted by an average brightness detection unit 1602.

The image data s0 and the coordinate information ar are inputted to the average brightness detection unit 1602. The average brightness detection unit 1602 detects (calculates) the average brightness value of the region (boundary proximity region) designated by the coordinate information ar. In the case of the image data s0 shown in FIG. 15A, the average brightness value for each of the two regions 370, 371 shown in FIG. 27 is detected. The average brightness detection unit 1602 then outputs the average brightness data APL representing the two detected average brightness values to the region detect ion unit 1303.

Figure 29:
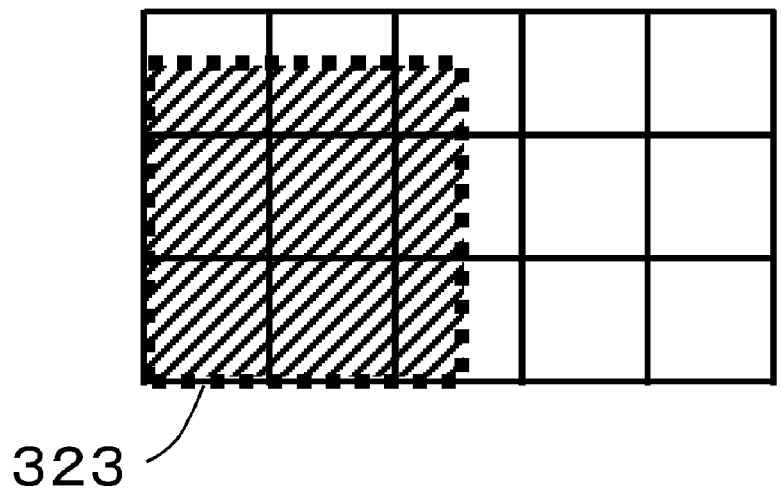
FIG. 29 illustrates an example of processing results obtained in the boundary movement unit according to Embodiment 5.

As mentioned hereinabove, in the boundary movement unit 1802, whether or not the boundary proximity region is a low-brightness region is determined from the average brightness value detected by the average brightness detection unit 1602. This determination is the same as that performed in Embodiment 3. Since the regions 370, 371 shown in FIG. 27 each includes only the pixels of the background section 1503, the average brightness values thereof are zero. Therefore, the regions 370, 371 are each determined as a low-brightness region, and the boundaries are moved into the regions 370, 371. In the present embodiment, the boundaries are moved through 200 pixels. As a result, the color region 320 becomes the region 323 shown in FIG. 29.

As described hereinabove, in accordance with the present embodiment, the boundary proximity region can be set and the effect same as that of Embodiments 3 and 4 can be obtained without setting the small divided regions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-081334, filed on Mar. 30, 2012, and Japanese Patent Application No. 2012-081336, filed on Mar. 30, 2012, which are hereby incorporated by reference herein in their entirety.

What is claimed is:

1. An image processing apparatus comprising:
   an acquisition unit that acquires a statistical value of pixel values for each divided region obtained by dividing an input image;
   a determination unit that compares for each divided region the statistical value of the divided region acquired by the acquisition unit with a first threshold and determines whether the divided region is as color region or a monochrome region; and
   a re-determination unit that compares a statistical value of an adjacent divided region, which is a divided region, from among divided regions determined by the determination unit as monochrome regions, that is adjacent to the divided region determined by the determination unit as a color region, with a second threshold, by which a divided region is more likely determined as a color region than by the first threshold, for each adjacent divided region, and re-determines whether the adjacent divided region is a color region or a monochrome region.

2. The image processing apparatus according to claim 1, further comprising a calculation unit that calculates for each adjacent divided region the second threshold on the basis of a statistical value of pixel values of the adjacent divided region and a statistical value of pixel values of a peripheral divided region, which is a divided region on a periphery of the adjacent divided region, from among divided regions determined by the determination unit as monochrome regions.

3. The image processing apparatus according to claim 2, wherein
   the calculation unit calculates the second threshold on the basis of a ratio of the number of monochrome pixels to the total number of pixels in a region obtained by combining the adjacent divided region and the peripheral divided region of the adjacent divided region, and
   the second threshold calculated when the ratio is large is a threshold by which a divided region is more likely determined as a color region than by the second threshold calculated when the ratio is small.

4. The image processing apparatus according to claim 2, wherein
   the calculation unit calculates the second threshold on the basis of uniformity of pixel values in a region obtained by combining the adjacent divided region and the peripheral divided region of the adjacent divided region, and the second threshold calculated when the uniformity is high is a threshold by which a divided region is likely determined as a color region than by the second threshold calculated when the uniformity is low.

5. The image processing apparatus according to claim 1, further comprising a calculation unit that calculates for each adjacent divided region the second threshold on the basis of uniformity of pixel values in an adjacent divided region, wherein the second threshold calculated when the uniformity is high is a threshold by which a divided region is more likely determined as a color region than by the second threshold calculated when the uniformity is low.

6. The image processing apparatus according to claim 2, wherein the peripheral divided region is a divided region continuous in a horizontal direction or vertical direction with respect to the adjacent divided region.

7. A control method for an image processing apparatus, the method comprising:

an acquisition step of acquiring a statistical value of pixel values for each divided region obtained by dividing an input image;

a determination step of comparing for each divided region the statistical value of the divided region acquired in the acquisition step with a first threshold and determining whether the divided region is a color region or a monochrome region; and a re-determination step of comparing a statistical value of an adjacent divided region, which is a divided region, from among divided regions determined in the determination step as monochrome regions, that is adjacent to the divided region determined in the determination step as a color region, with a second threshold, by which a divided region is more likely determined as a color region than by the first threshold, for each adjacent divided region, and re-determining whether the adjacent divided region is a color region or a monochrome region.

* * * * *